(12) United States Patent
Zhao et al.

(10) Patent No.: US 10,505,237 B2
(45) Date of Patent: Dec. 10, 2019

(54) BATTERY, HOUSING STRUCTURE, METHOD FOR PROTECTING A CELL, MOVABLE OBJECT AND KIT THEREOF

(71) Applicant: SZ DJI TECHNOLOGY CO., LTD., Shenzhen (CN)

(72) Inventors: Tao Zhao, Shenzhen (CN); Wentao Wang, Shenzhen (CN); Lei Wang, Shenzhen (CN); Yuancai Liu, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 47 days.

(21) Appl. No.: 15/860,008

(22) Filed: Jan. 2, 2018

(65) Prior Publication Data

US 2018/0145380 A1 May 24, 2018

Related U.S. Application Data

(63) Continuation of application No. PCT/CN2015/083164, filed on Jul. 2, 2015.

(51) Int. Cl.

| | |
|---|---|
| *H01M 10/00* | (2006.01) |
| *H01M 10/60* | (2014.01) |
| *H01M 2/02* | (2006.01) |
| *H01M 2/10* | (2006.01) |
| *H01M 10/48* | (2006.01) |
| *H01M 10/6553* | (2014.01) |
| *H01M 10/6567* | (2014.01) |
| *H01M 10/6554* | (2014.01) |
| *H01M 10/0525* | (2010.01) |

(52) U.S. Cl.
CPC ............. *H01M 10/60* (2015.04); *H01M 2/02* (2013.01); *H01M 2/1022* (2013.01); *H01M 10/486* (2013.01); *H01M 10/6553* (2015.04); *H01M 10/6554* (2015.04); *H01M 10/6567* (2015.04); *H01M 10/0525* (2013.01)

(58) Field of Classification Search
CPC .... H01M 10/60; H01M 2/02; H01M 10/0525; H01M 10/6554; H01M 10/468; H01M 10/6553
See application file for complete search history.

(56) References Cited

U.S. PATENT DOCUMENTS

| | | | |
|---|---|---|---|
| 2012/0249060 A1* | 10/2012 | Stoddard | ................... A61L 2/07 320/107 |
| 2013/0192271 A1* | 8/2013 | Barnhart | ................ F25B 21/04 62/3.3 |
| 2014/0374055 A1 | 12/2014 | Payne | |

FOREIGN PATENT DOCUMENTS

| | | |
|---|---|---|
| CN | 101728597 A | 6/2010 |
| CN | 201629380 U | 11/2010 |
| CN | 102157715 A | 8/2011 |

(Continued)

OTHER PUBLICATIONS

The World Intellectual Property Organization (WIPO) International Search Report and Written Opinion for PCT/CN2015/083164 dated Mar. 24, 2016 8 Pages.

*Primary Examiner* — Cynthia H Kelly
*Assistant Examiner* — Monique M Wills
(74) *Attorney, Agent, or Firm* — Anova Law Group, PLLC

(57) ABSTRACT

A battery includes a housing including a cell accommodating part, a cell accommodated in the cell accommodating part, and a temperature regulating element configured to regulate an ambient temperature within the cell accommodating part.

20 Claims, 23 Drawing Sheets

(56) References Cited

FOREIGN PATENT DOCUMENTS

| | | |
|---|---|---|
| CN | 102403543 A | 4/2012 |
| CN | 202871893 U | 4/2013 |
| CN | 203288718 A | 11/2013 |
| CN | 203312425 U | 11/2013 |
| CN | 103474715 A | 12/2013 |
| WO | 2010094438 A1 | 8/2010 |

\* cited by examiner

BATTERY, HOUSING STRUCTURE, METHOD FOR PROTECTING A CELL, MOVABLE OBJECT AND KIT THEREOF

CROSS-REFERENCE TO RELATED APPLICATION

This is a continuation application of International Application No. PCT/CN2015/083164, filed on Jul. 2, 2015, the entire contents of which are incorporated herein by reference.

TECHNICAL FIELD

The present disclosure relates to an energy storage apparatus and a mobile device having the energy storage apparatus, and more particularly, to a battery, a housing structure, a method for protecting a cell, a movable object, and a kit thereof.

BACKGROUND

A lithium ion battery of an unmanned aircraft can comprise multiple cells that are connected in series and/or in parallel. The lithium ion battery can discharge at a high discharge rate during flight. Various technical problems may arise in using conventional lithium ion batteries.

For example, a rapid rise in temperature of the battery can shorten a service life of the battery. As another example, a performance of the battery can be adversely affected when operating in a low-temperature environment (e.g., below 5° C.). Further, when a battery pack including multiple cells is used in a high temperature environment or a low temperature environment, temperature distribution across the multiple cells can be uneven, and thus a performance and a cycle life of the battery pack can be adversely affected.

Therefore, it is desired that the lithium ion battery is provided with an intelligent thermal management function including a heating up, a cooling down, and a thermal balancing, such that a satisfactory system temperature (for example, 5-45° C.) can be maintained in various high and low temperature environments, and a uniform temperature distribution can be maintained among cells of the battery.

However, most conventional lithium ion batteries for unmanned aircrafts are not provided with a temperature regulating function, and various problems can be found in those conventional lithium batteries that have a temperature regulating function.

SUMMARY

In accordance with the disclosure, there is provided a battery including a housing including a cell accommodating part, a cell accommodated in the cell accommodating part, and a temperature regulating element configured to regulate an ambient temperature within the cell accommodating part.

Also in accordance with the disclosure, there is provided an electric actuating device, a main controller configured to control an operating state of the electric actuating device, and a battery coupled to the electric actuating device and configured to provide power to the electric actuating device. The battery includes a housing including a cell accommodating part, a cell accommodated in the cell accommodating part, and a temperature regulating element configured to regulate an ambient temperature within the cell accommodating part.

DETAILED DESCRIPTION OF THE EMBODIMENTS

Figure 1:
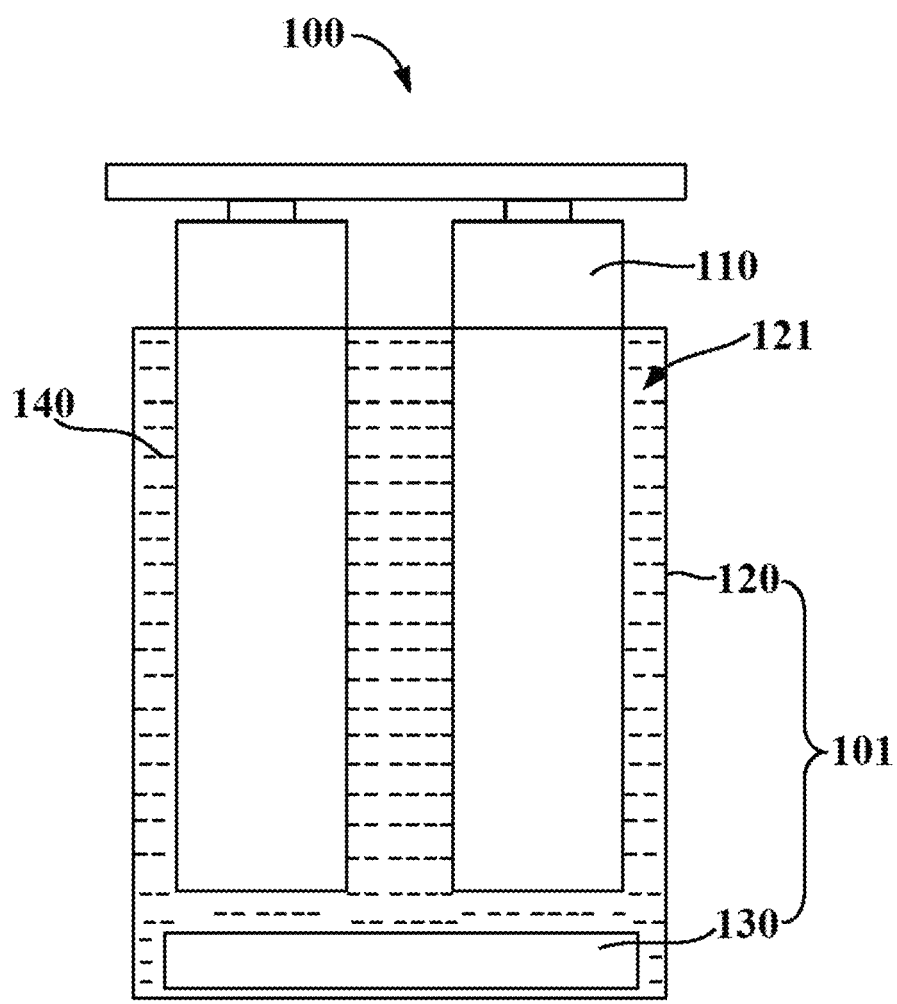
FIG. 1 shows a structure of a battery in accordance with an embodiment of the disclosure.

Technical solutions of the present disclosure will be described with reference to the drawings. It will be appreciated that embodiments as described in the disclosure are some rather than all of the embodiments of the present disclosure. Other embodiments, which are conceived by those having ordinary skills in the art on the basis of the disclosed embodiments without inventive efforts, should fall within the scope of the present disclosure.

In this disclosure, if a component is described as "being fixed to" another component, it can be directly fixed to the other component, or an intermediate component can be provided therebetween. If a component is described as "being coupled to" another component, it can be directly coupled to the other component, or an intermediate component can be provided therebetween. Terms such as "vertical," "horizontal," "left," and "right" as used in the disclosure, are merely illustrative.

Unless otherwise defined, technical and scientific terms, as used in the disclosure, have the same meaning as commonly understood by those skilled in the field of the disclosure. The terms as used in the disclosure are intended to illustrate the embodiments, not to limit the disclosure. The term "and/or," as used in the disclosure, comprises any and all combinations of one or more items as listed.

A movable object in accordance with embodiments of the disclosure can be provided with a battery having an intelligent thermal management function. The movable object can be an unmanned aircraft, a gimbal onboard a vehicle, a gimbal on-board an aircraft, or a hand-held gimbal. The battery can be provided with an intelligent thermal management function including a heating up, a cooling down, and/or a thermal balancing.

In some embodiments of the disclosure, the battery can comprise a plurality of cells, a thermal conducting medium, and a temperature regulating element. The plurality of cells can be connected in parallel or in series, or connected in series and parallel. The thermal conducting medium can transfer the heat from the plurality of cells. For example, the thermal conducting medium can transfer heat between the temperature regulating element and the plurality of cells, and/or transfer heat between the plurality of cells.

In some embodiments of the disclosure, the thermal conducting medium can comprise at least one of a thermal conducting frame, a thermal conducting housing, a heat-conducting fluid, or a sealant. In some instances, the plurality of cells can be mounted in the thermal conducting housing using the thermal conducting frame, and a thermal loop can be formed by the thermal conducting frame and the thermal conducting housing. Optionally, the plurality of cells can be mounted in the thermal conducting housing in which the heat-conducting fluid can be provided and sealed with a sealant. A thermal loop can be formed by the heat-conducting fluid, the thermal conducting housing and the sealant.

In some embodiments of the disclosure, the temperature regulating element can comprise at least one of a heater, a cooler, or a temperature-changing apparatus. For example, the heater can be a heating resistor wire, a polyethylenamine heating sheet, a positive temperature coefficient (PTC) heating sheet, or a heating resistor. The cooler can be a fan. The temperature-changing apparatus can be a semiconductor cooling plate.

In some embodiments of the disclosure, the temperature regulating element can be controlled by a processor. For example, a temperature of the battery can be detected by a temperature sensor and fed to the processor. The processor can be configured to control a switch to switch between a heating function and a heat dissipating function based upon the detected temperature, to maintain the system temperature of the battery within a preset temperature range (for example, 5-45° C.). A battery heating state, a battery cooling state, and a battery temperature normal state can be indicated by an LED of the battery and/or an external display device. The processor can be independent from a main power loop of the battery. The function of the processor can be activated before or after the battery is installed to the aircraft.

The cooling function can be activated when the temperature of the battery is too high. The heating function can be activated when the temperature of the battery is too low. Therefore, a satisfactory system temperature (for example, 5-45° C.) can be maintain in various high and low temperature environments, thereby a scope of application of the battery can be expanded and the operating state of the battery can be improved. Meanwhile, temperature uniformity can be maintained among cells by the thermal conducting medium, such that a service life of the battery can be extended.

In some embodiments of the disclosure, the thermal conducting medium can include a solid thermal loop or a liquid thermal loop. The liquid thermal loop can operate in a passive liquid cooling mode under which no additional power is required to drive a flow of the liquid. Therefore, a structure of the liquid thermal loop can be simple with substantially no power consumption.

Illustrative embodiments of the disclosure will be described with reference to the drawings. The embodiments and features can be combined with one another provided that they are technically compatible.

FIG. 1 schematically shows an example battery 100 consistent with the disclosure. As shown in FIG. 1, the battery 100 comprises one or more cells 110 and a housing structure 101 configured to accommodate the one or more cells 110. The housing structure 101 comprises a housing 120 and a temperature regulating element 130.

The housing 120 includes a cell accommodating part 121. The one or more cells 110 are accommodated in the cell accommodating part 121. The cell accommodating part 121 can include a frame or an accommodation compartment. In the example shown in FIG. 1, the battery 100 includes one cell accommodating part 121. In some other embodiments, a battery can include two or more cell accommodating parts 121 according to actual needs. For example, the battery can include one, two, three, four, five, or more than five cell accommodating parts 121.

The temperature regulating element 130 is disposed at the housing 120 and configured to regulate an ambient temperature within the cell accommodating part 121. The temperature regulating element 130 can comprise at least one of a heater, a cooler, or a temperature-changing apparatus. The heater can include an electrical heater. The cooler can comprise at least one of an electrical cooling apparatus or a heat dissipation fan. The temperature-changing apparatus can include a semiconductor cooling plate.

In some embodiments, as shown in FIG. 1, the battery 100 comprises a flowable thermal conducting medium 140 to effect a thermal balance between a plurality of cells 110. The flowable thermal conducting medium 140 can be filled within the cell accommodating part 121. In some embodiments, each of the cells 110 can be at least partially enclosed by the flowable thermal conducting medium 140, such that the flowable thermal conducting medium 140 can transfer heat between the plurality of cells 110.

In some embodiments, the housing 120 can include a conductor. The flowable thermal conducting medium 140 can contact the housing 120 to exchange heat with the housing 120.

The flowable thermal conducting medium 140 can comprise at least one of a heat-conducting fluid or heat-conducting particles. For example, the heat-conducting particles can include silicone particles. The heat-conducting fluid can include water, ethylene glycol, or propylene glycol.

In some embodiments, the flowable thermal conducting medium 140 can comprise a heat-conducting fluid. The heat-conducting fluid can be sealed within the cell accommodating part 121, and the one or more cells 110 can be at least partially immersed in the heat-conducting fluid. In some other embodiments, the flowable thermal conducting medium 140 can include heat-conducting particles. The one or more cells 110 can be at least partially inserted in a particle pile formed by the heat-conducting particles.

The temperature regulating element 130 can be configured to heat or cool down the flowable thermal conducting medium 140 in various ways in view of actual needs. For example, in the illustrative embodiment shown in FIG. 1, the temperature regulating element 130 can be at least partially immersed in the heat-conducting fluid to heat or cool down the heat-conducting fluid.

In some other embodiments, the housing 120 can include a thermal conducting medium. The temperature regulating element 130 can be connected with the housing 120, and the thermal conducting medium can be heated and/or cooled by a thermal conduction through the housing 120. For example, the temperature regulating element 130 can be provided on an outer surface of the housing 120, and a thermal conduction can be effected through a sidewall of the housing 120.

Figure 2:
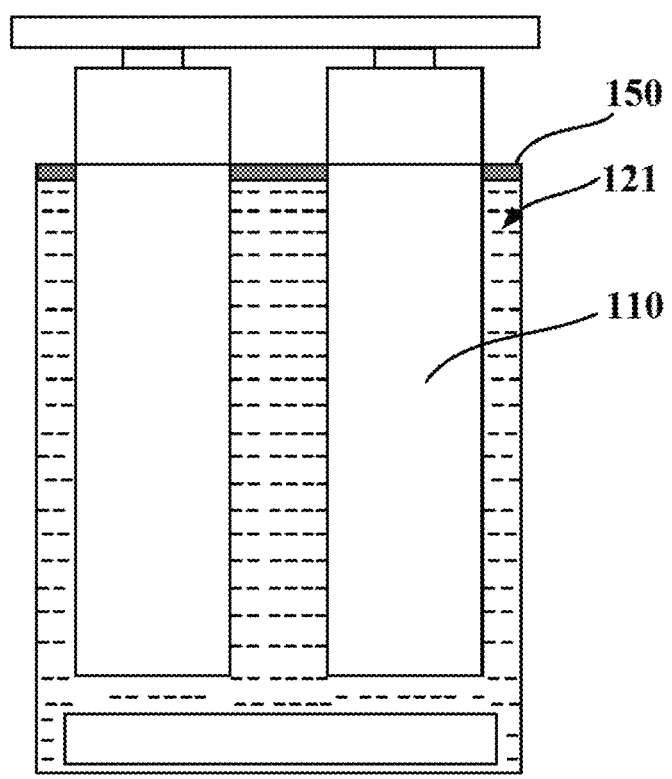
FIG. 2 shows a structure of a battery in accordance with another embodiment of the disclosure.

The heat-conducting fluid can be sealed within the housing 120 in various ways in view of actual needs. FIG. 2 shows another example of the battery 100 consistent with the disclosure. As shown in FIG. 2, the battery 100 further comprises a sealant 150. The sealant 150 can seal a gap between an opening circumference of the cell accommodating part 121 and the one or more cells 110. In the embodiments that the battery 100 includes a plurality of cells 110, the sealant 150 can also be provided to seal gaps between the plurality of cells 110. The sealant 150 can include various types of adhesives. In some embodiments, the sealant 150 can include a thermally conductive adhesive such as silicone. Optionally, the sealant 150 can include an electrical insulting adhesive.

Figure 3:
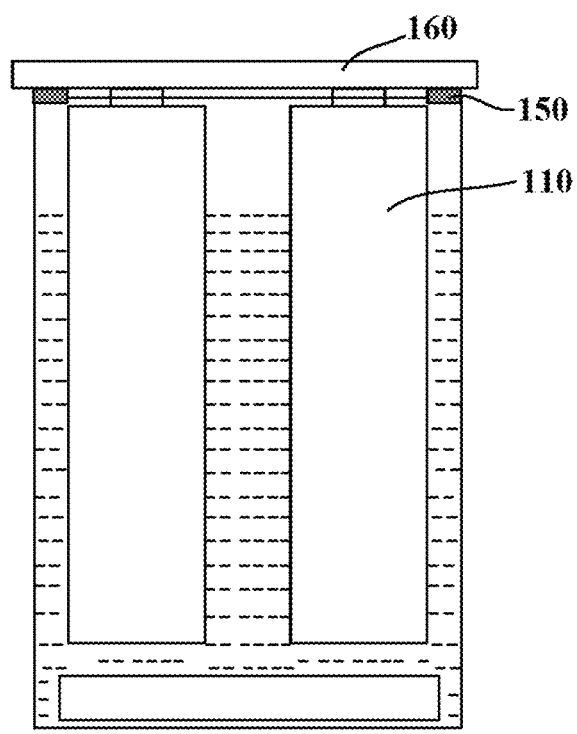
FIG. 3 shows a structure of a battery in accordance with another embodiment of the disclosure.

FIG. 3 shows another example of the battery 100 consistent with the disclosure. As shown in FIG. 3, the battery 100 comprises the sealant 150 and an electrode tab plate 160. The electrode tab plate 160 can cover an opening of the housing 120. The sealant 150 can seal a gap between an opening circumference of the housing 120 and the electrode tab plate 160. The sealant 150 can include various types of adhesives. In some embodiments, the sealant 150 can include a thermally conductive adhesive such as silicone. Optionally, the sealant 150 can include an electrical insulting adhesive.

In some embodiments, in order to maintain a good electrical insulation between the electrode tab plate 160 and the liquid within the housing 120, an electrical insulating member can be provided on a surface of the electrode tab plate 160 in proximity to the cell accommodating part 121, such that the electrode tab plate 160 and the heat-conducting fluid within the cell accommodating part can be thermally conductive but electrically insulated from each other.

The surface of the electrode tab plate 160 that is in proximity to the cell accommodating part 121 can be insulated from the heat-conducting fluid within the cell accommodating part 121 in various ways in view of actual needs. In some embodiments, the surface of the electrode tab plate 160 that is in proximity to the cell accommodating part 121 can be an insulating surface. Optionally, an electrically insulating and thermally conductive member can be provided between the electrode tab plate 160 and the opening of the cell accommodating part 121, the electrically insulating and thermally conductive member can seal the opening of the cell accommodating part 121, with the cell 110 passing through the electrically insulating and thermally conductive member. A thermal exchange can be effected between the electrode tab plate 160 and the heat-conducting fluid through the electrically insulating and thermally conductive member.

In some embodiments, the electrode tab plate 160 can be connected with but insulated from the opening circumference of the housing 120. In some embodiments, the sealant 150 sealing the gap between the opening circumference of the housing 120 and the electrode tab plate 160 can include an electrically insulting adhesive. Optionally, an insulating member can be provided in the gap between the opening circumference of the housing 120 and the electrode tab plate 160.

The temperature regulating element 130 can be provided in various ways in view of actual needs. For example, in the illustrative embodiment shown in FIG. 1, the temperature regulating element 130 is provided inside the housing 120 and immersed within the flowable thermal conducting medium 140.

In the illustrative embodiment shown in FIG. 2, the battery 100 comprises the electrode tab plate 160. The plurality of cells 110 can be fixedly connected with the electrode tab plate 160, and the temperature regulating element 130 can be mounted on the electrode tab plate 160.

The temperature regulating element 130 can heat or cool down the one or more cells 110 by a thermal conduction through the electrode tab plate 160. In some embodiments, the temperature regulating element 130 can comprise a heating plate. The heating plate can be adhered onto the electrode tab plate 160, and a temperature of the plurality of cells 110 can be increased by a thermal conduction through the electrode tab plate 160. Optionally, the temperature regulating element 130 can comprise a cooling plate. The cooling plate can be adhered onto the electrode tab plate 160, and a temperature of the plurality of cells 110 can be decreased by a thermal conduction through the electrode tab plate 160. Optionally, the temperature regulating element 130 can comprise a semiconductor cooling plate. The semiconductor cooling plate can be adhered onto the electrode tab plate 160, and a temperature of the plurality of cells 110 can be increased or decreased by a thermal conduction through the electrode tab plate 160.

A temperature of the one or more cells 110 can be increased or decreased by the temperature regulating element 130 through an airflow thermal exchange. For example, the temperature regulating element 130 can comprise a fan. The fan can be mounted on the electrode tab plate 160 and configured to provide an airflow to the plurality of cells 110.

Figure 4:
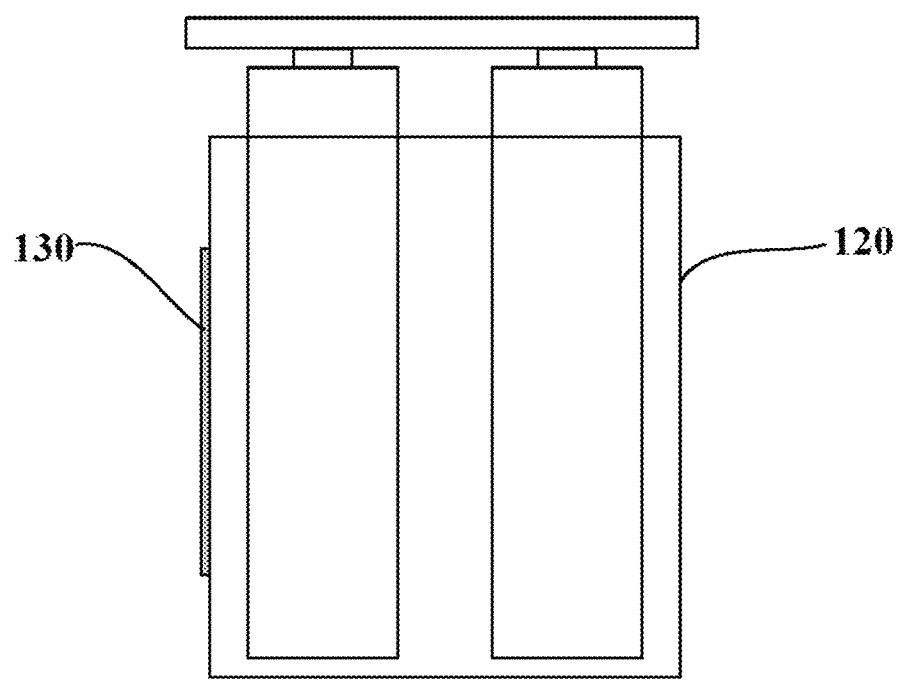
FIG. 4 shows a structure of a battery in accordance with another embodiment of the disclosure.
Figure 5:
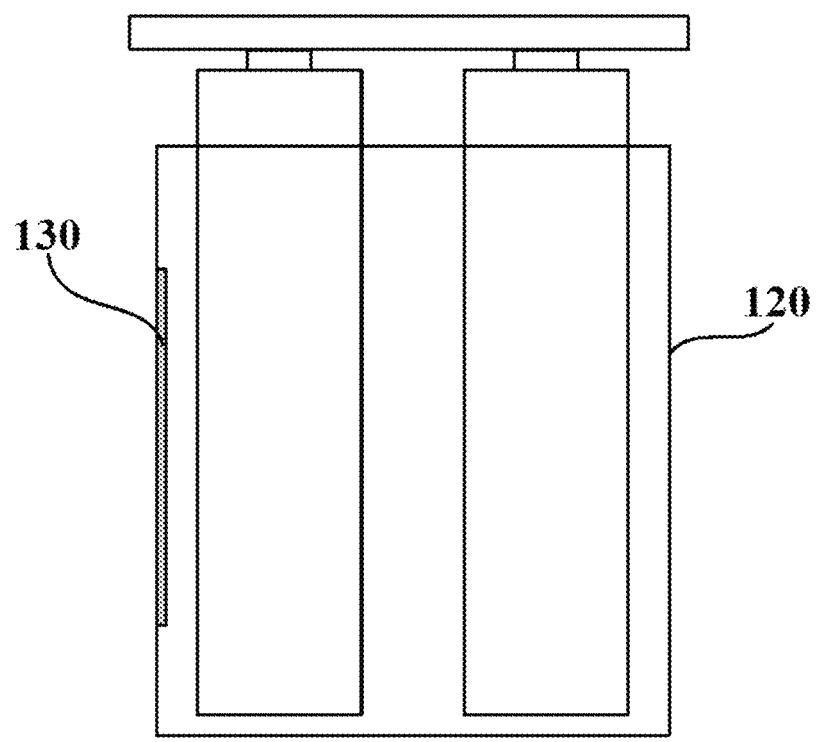
FIG. 5 shows a structure of a battery in accordance with another embodiment of the disclosure.
Figure 6:
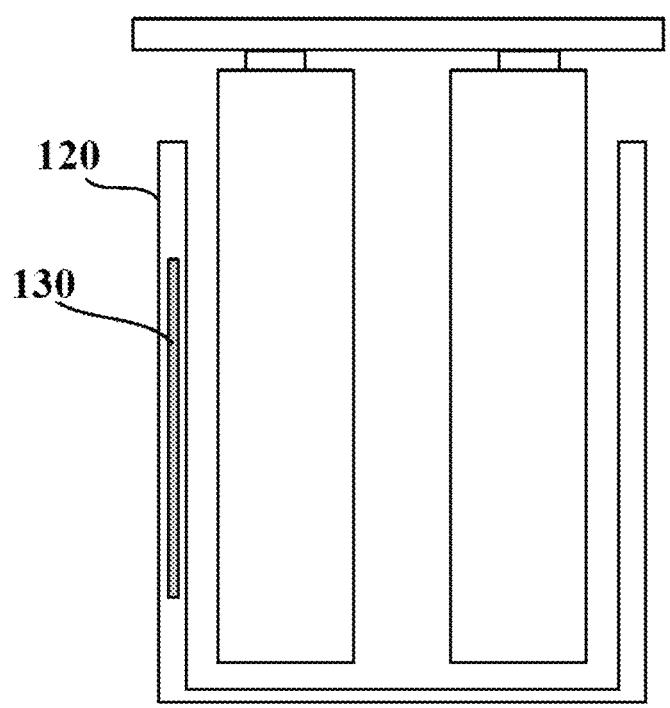
FIG. 6 shows a structure of a battery in accordance with another embodiment of the disclosure.

In some embodiments, the temperature regulating element 130 can be provided on the housing 120. FIGS. 4-6 show other examples of the battery 100 consistent with the disclosure. The housing 120 can include a thermal conductor, and the temperature regulating element 130 can be provided on an outer surface of the housing 120 as shown in FIG. 4, provided on an inner surface of the housing 120 as shown in FIG. 5, or embedded inside the sidewall of the housing 120 as shown in FIG. 6.

In some embodiments, the housing 120 can include a thermal insulator. In these embodiments, the temperature regulating element 130 can be provided on the inner surface of the housing 120. The arrangement is similar to that shown in FIG. 5.

Figure 7:
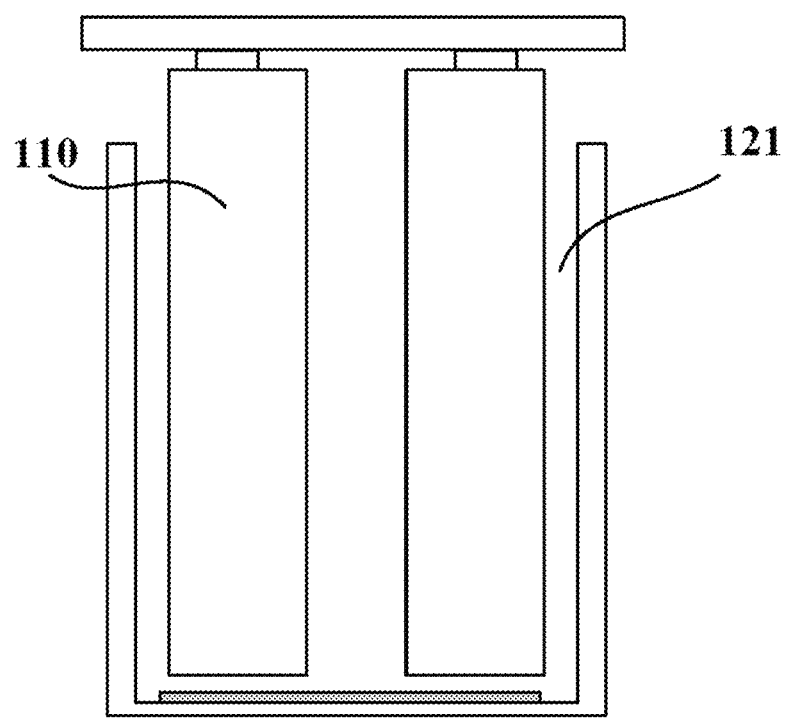
FIG. 7 shows a structure of a battery in accordance with another embodiment of the disclosure.

FIG. 7 shows another example of the battery 100 consistent with the disclosure. As shown in FIG. 7, the cell accommodating part 121 of the housing 120 includes a bottom. The temperature regulating element 130 can be provided on the bottom of the cell accommodating part 121.

The one or more cells 110 of the battery 100 can be provided in the cell accommodating part 121 in various ways in view of actual needs. For example, in the illustrative embodiment shown in FIG. 1, a plurality of cells 110 are accommodated in the one cell accommodating part 121. The flowable thermal conducting medium 140 can be provided in the cell accommodating part 121 to fill the gap between the plurality of cells 110 and the gap between the plurality of cells 110 and the sidewall of the housing 120. In other words, the flowable thermal conducting medium 140 can be contained in the cell accommodating part 121, and each of the cells 110 can be at least partially enclosed by the flowable thermal conducting medium 140, such that a heat transfer between the plurality of cells 110 can be effected by the flowable thermal conducting medium 140. The flowable thermal conducting medium 140 can contact the housing 120 to effect a heat exchange with the housing 120.

Figure 8:
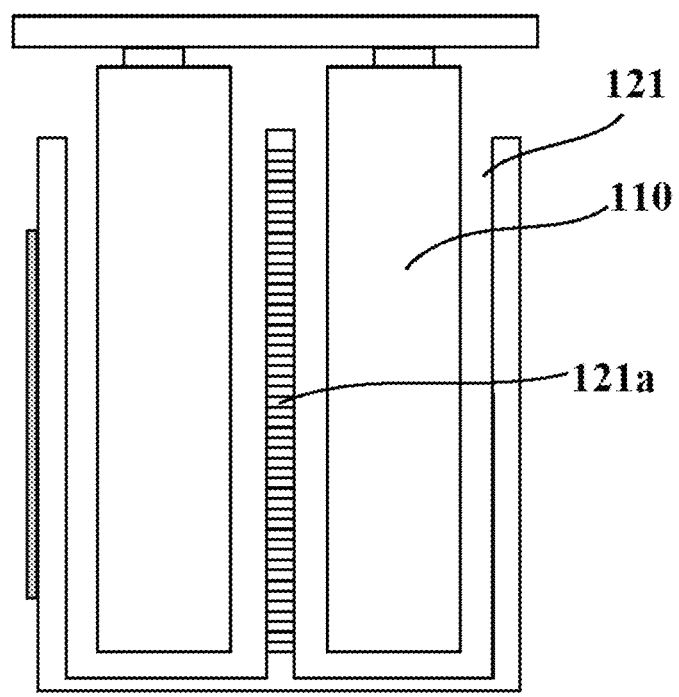
FIG. 8 shows a structure of a battery in accordance with another embodiment of the disclosure.

FIG. 8 shows another example of the battery 100 consistent with the disclosure. In the example shown in FIG. 8, the battery 100 includes a plurality of cells 110 and a plurality of cell accommodating parts 121 corresponding to the plurality of cells 110. The flowable thermal conducting medium 140 can be provided in the cell accommodating parts 121 to fill the gap between a cell 110 and the sidewall of a corresponding cell accommodating part 121.

In some embodiments, as shown in FIG. 8, a mesh 121a is provided at the sidewall of each cell accommodating part 121 through which adjacent two cell accommodating parts 121 can communicate with each other. In some embodiments, the flowable thermal conducting medium 140 can include a heat-conducting fluid. The heat-conducting fluid can circulate between adjacent cell accommodating parts 121 through the mesh 121a. In some embodiments, the flowable thermal conducting medium can include heat-conducting particles or heat-conducting powders. A particle size of the heat-conducting particle or the heat-conducting powder can be less than an aperture diameter of the mesh 121a, such that the heat-conducting particles or the heat-conducting powders can enter into adjacent cell accommodating parts 121 through the mesh 121a.

Figure 9:
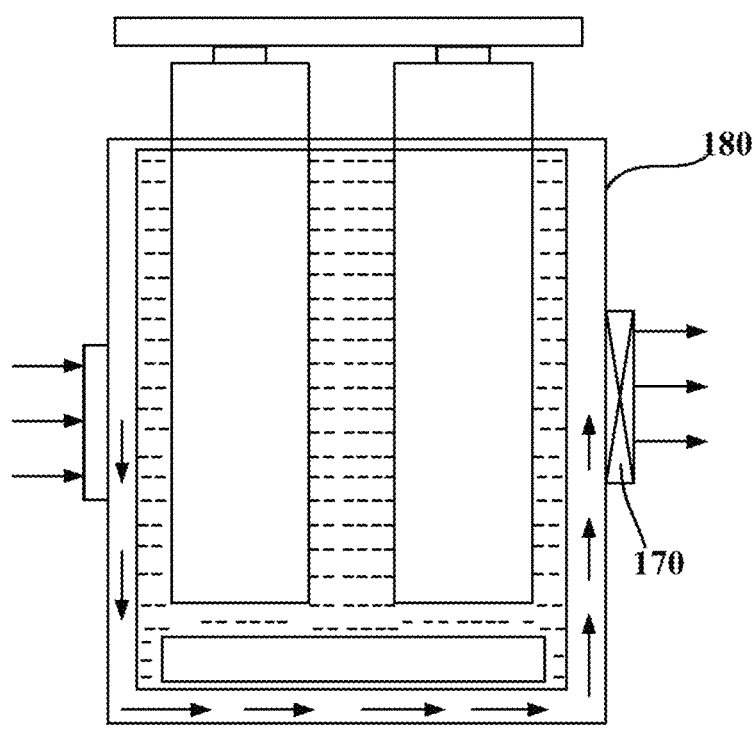
FIG. 9 shows a structure of a battery in accordance with another embodiment of the disclosure.

FIG. 9 shows another example of the battery 100 consistent with the disclosure. As shown in FIG. 9, the battery 100 further comprises a heat dissipation fan 170 and a thermally insulating casing 180. The structure shown in FIG. 9 can further improve an efficiency of the cooling function and the heating function of the battery 100. The housing 120 can be accommodated in the casing 180 with a gap between the housing 120 and the casing 180 to form a heat dissipation channel. The heat dissipation fan 170 can be provided to the heat dissipation channel, such that an airflow within the heat dissipation channel can be driven and circulated to an outside environment of the casing 180.

In some embodiments, the heat dissipation fan 170 can be deactivated if the temperature regulating element 130 performs a heating function. The heat dissipation fan 170 can be activated if the temperature regulating element 130 performs a cooling function.

The heat dissipation fan 170 can be provided in various ways in view of actual needs. For example, in the illustrative embodiment shown in FIG. 9, the heat dissipation fan 170 is provided on the casing 180. The heat at the outer surface of the housing 120 can be absorbed by an airflow flowing through the heat dissipation channel and discharged to the outside environment of the casing 180 using the heat dissipation fan 170.

Figure 10:
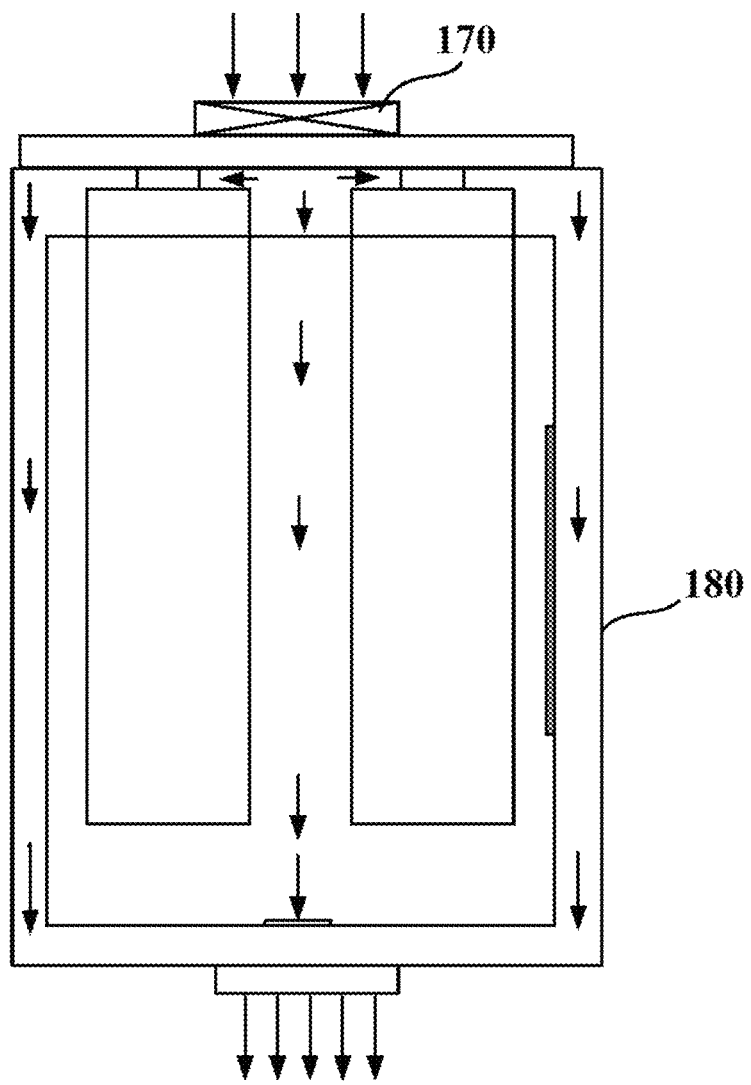
FIG. 10 shows a structure of a battery in accordance with another embodiment of the disclosure.

FIG. 10 shows another example of the battery 100 consistent with the disclosure. As shown in FIG. 10, the housing 120 can communicate with the heat dissipation channel. The heat dissipation fan 170 can drive an airflow within the cell accommodating part 121 and discharge the airflow to the outside environment of the casing 180 through the heat dissipation channel. The heat dissipation fan 170 can be mounted on the sidewall or the bottom wall of the cell accommodating part 121.

Figure 11:
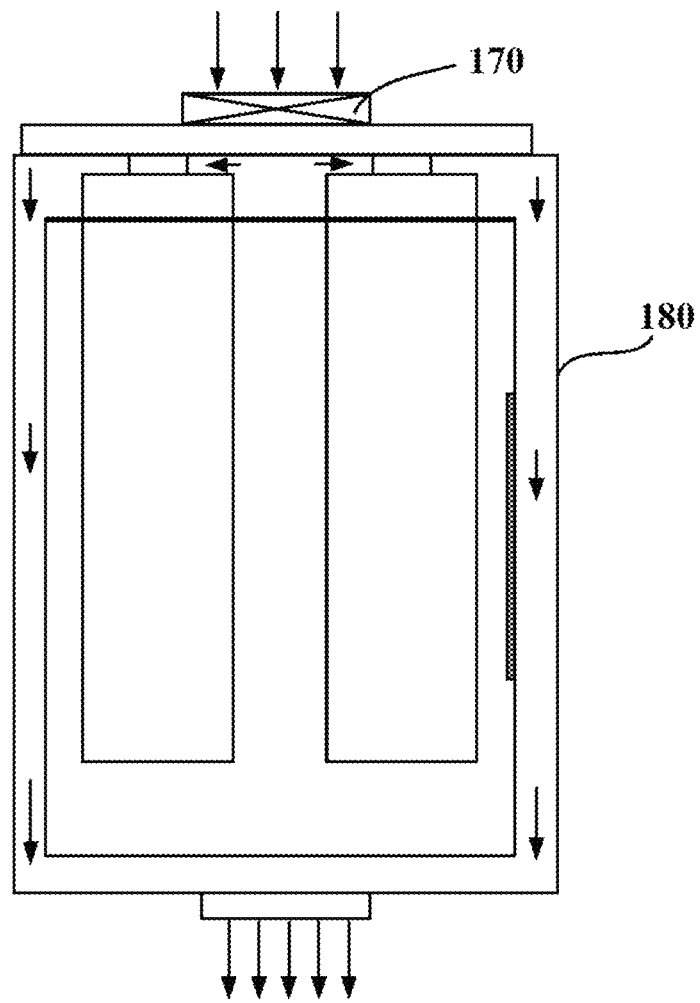
FIG. 11 shows a structure of a battery in accordance with another embodiment of the disclosure.

As shown in FIG. 11, the housing 120 can communicate with the heat dissipation channel. The heat dissipation fan 170 can drive an airflow within the cell accommodating part 121 and discharge the airflow to outside environment of the casing 180 through the heat dissipation channel. The battery 100 further comprises the electrode tab plate 160. The plurality of cells 110 can be fixedly connected with the electrode tab plate 160, and the heat dissipation fan 170 can be mounted on the electrode tab plate 160.

Figure 12:
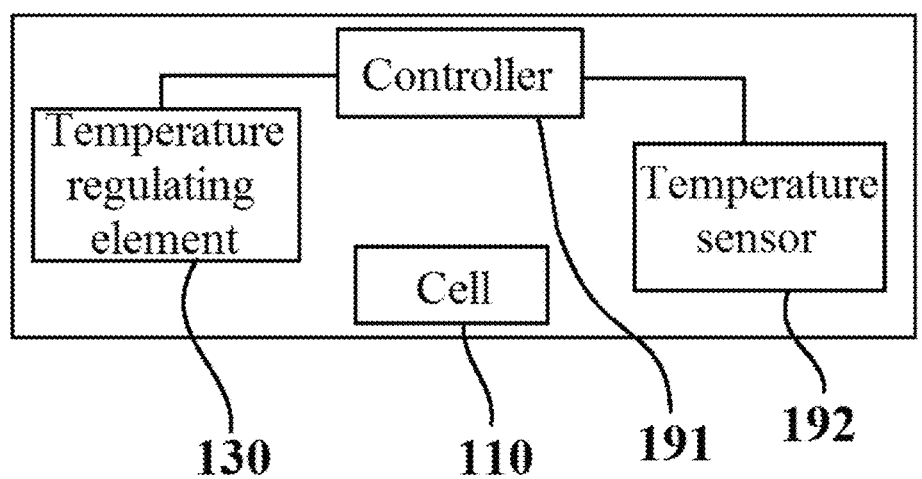
FIG. 12 shows a schematic circuit diagram of a battery in accordance with an embodiment of the disclosure.

FIG. 12 shows a block diagram of the battery 100 consistent with the disclosure. As shown in FIG. 12, the battery 100 comprises a controller 191 and a temperature sensor 192 for regulating an internal temperature of the battery 100. The temperature sensor 192 can be in communication connection with the temperature sensor 192. The temperature sensor 192 can be configured to detect an ambient temperature inside the cell accommodating part 121 and transmit the detected ambient temperature to the controller 191. The controller 191 can be electrically connected with the temperature regulating element 130 to direct the temperature regulating element 130 to perform the heating function or the cooling function.

In some embodiments, the controller 191 can direct the temperature regulating element 130 to perform the cooling function if the detected ambient temperature is higher than a preset high temperature. The preset high temperature can be, for example, in the range of 40-50° C. Further, the controller 191 can direct the temperature regulating element 130 to perform the heating function if the detected ambient temperature is lower than a preset low temperature. The preset low temperature can be, for example, in the range of 5-10° C.

Figure 13:
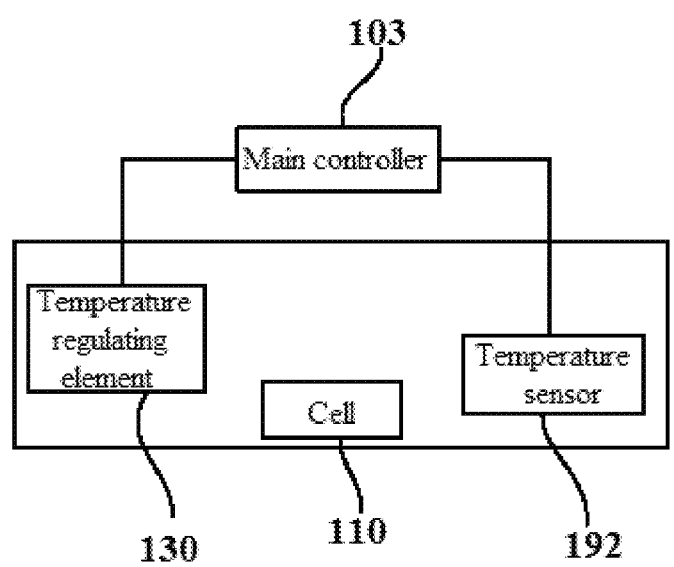
FIG. 13 shows a schematic circuit diagram of a battery in accordance with another embodiment of the disclosure.

FIG. 13 shows another example of the battery 100 consistent with the disclosure. In the example shown in FIG. 13, a main controller 103 (of the apparatus to which the battery 100 provides power) can be used to control the heating and cooling down of the battery 100. As shown in FIG. 13, the temperature sensor 192 can be in communication connection with the main controller 103. The temperature sensor 192 can sense the ambient temperature inside the cell accommodating part 121 and deliver the ambient temperature sensed to the main controller 103. The main controller can be electrically connected with the temperature regulating element 130 to control the temperature regulating element 130 to perform the heating or the cooling function based upon the ambient temperature.

In some embodiments, if the ambient temperature is higher than a preset high temperature, the main controller can control the temperature regulating element 130 to perform the cooling function. The preset high temperature can be, for example, in the range of 40-50° C. If the ambient temperature is lower than a preset low temperature, the main controller can control the temperature regulating element 130 to perform the heating function. The preset low temperature can be, for example, in the range of 5-10° C.

Various illustrative embodiments of the battery will be further described by reference to the drawings.

Figure 14:
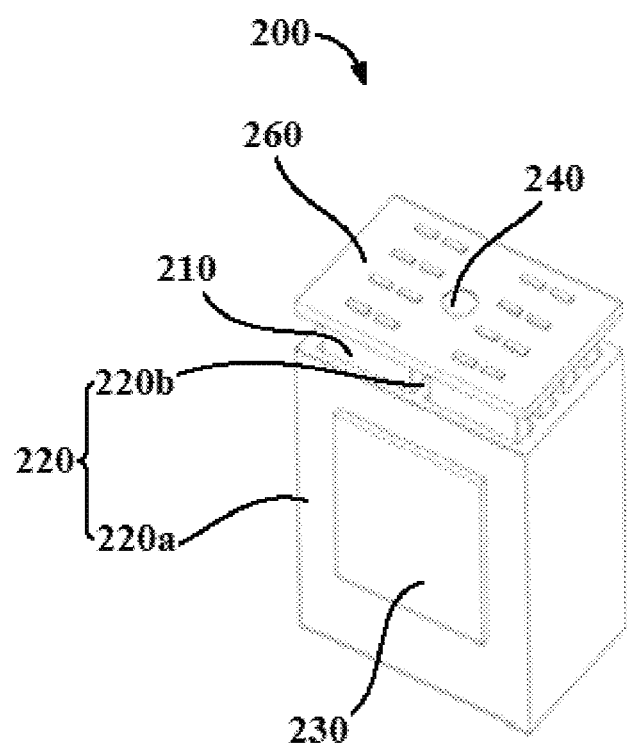
FIG. 14 shows a perspective view of a battery in accordance with an embodiment of the disclosure.
Figure 15:
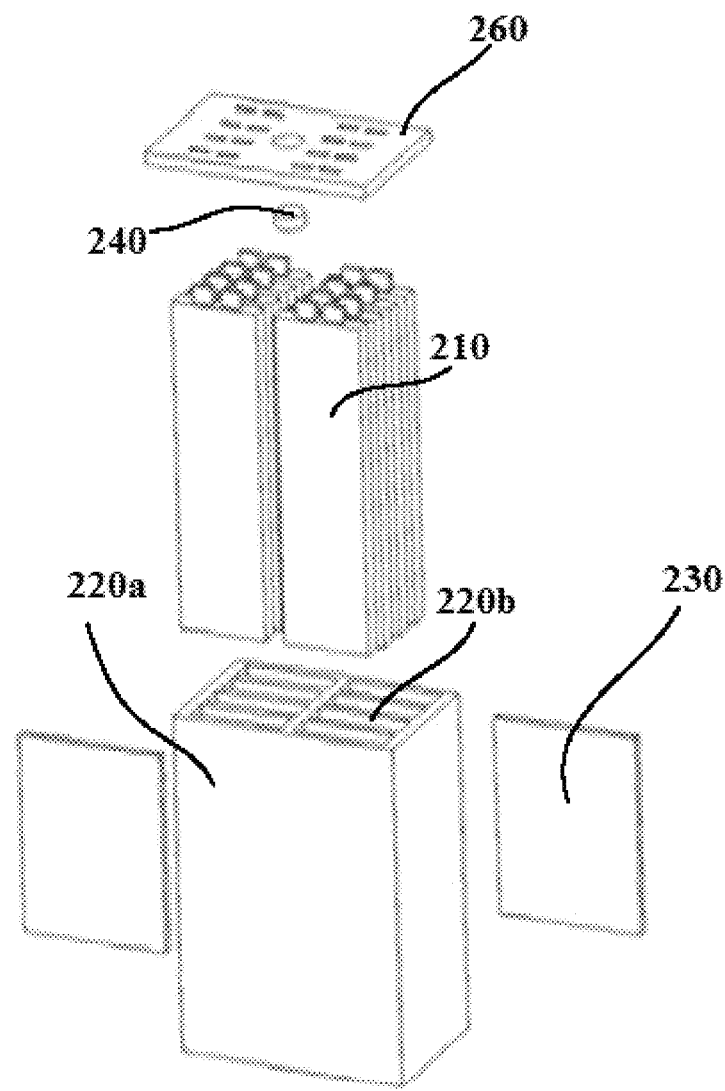
FIG. 15 shows an exploded view of the battery of FIG. 14.

FIG. 14 and FIG. 15 show another example battery 200 consistent with the disclosure. The battery 200 comprises cells 210, a thermal conducting medium 220, a heater 230, a cooler 240, and a controller (not shown). The example batteries shown in FIGS. 14-17 and described below include multiple cells. In some other embodiments, however, a battery consistent with the disclosure can include one cell.

The battery 200 further comprises an electrode tab plate 260. The cells 210 can be soldered on the electrode tab plate 260 and connected in series and/or parallel, and immersed in the thermal conducting medium 220. A good area contact between the thermal conducting medium 220 and the surfaces of the cells 210 can be formed. In some embodiments, as shown in FIGS. 14 and 15, the thermal conducting medium 220 comprises a thermal conducting housing 220a and a thermal conducting frame 220b provided in the thermal conducting housing 220a. The thermal conducting medium 220 can be made of aluminum, an aluminum alloy, copper, or copper alloy. The cooler 240 can be a cooling fan. The cooler 240 can be mounted at a middle portion of the electrode tab plate 260. The heater 230 can be mounted on two sidewalls of the thermal conducting housing 220a of the thermal conducting medium 220 of the battery 200. The heater 230 can be a polyethylenamine heating sheet.

In some embodiments, when the battery 200 is overheated during discharging (for example, higher than 45° C.), the temperature sensor can detect the temperature and feed it back to a control unit. The cooling fan can be activated to generate an airflow flowing from a top of the battery 200 to a bottom of the battery 200 to lower the temperature of the battery 200. The cooling fan can be deactivated if the temperature of the battery 200 drops to, e.g., 40° C. Meanwhile, the heat generated by the cells 210 can be transferred to the thermal conducting housing 220a of the thermal conducting medium 220 by the thermal conducting medium 220 and dissipated through thermal radiation. Because a good area contact is formed between each cell 210 and the thermal conducting medium 220, a good thermal conduction can be realized between different cells 210, and hence temperatures of the plurality of cells 210 can be maintained uniform.

In some embodiments, when the temperature of the battery 200 is too low (for example, lower than 5° C.), the temperature sensor can detect the temperature and feed it back to the control unit. The heater 230 can be activated to perform the heating function. For example, the battery 200 can provide a low current to power the heating unit to generate heat. Because a good thermal conduction is effected between the heater 230 and the thermal conducting housing 220a of the thermal conducting medium 220, the heat generated can be transferred to each cell 210 through the thermal conducting medium 220 to increase a temperature of each cell 210, such that the temperature of the battery 200 can be increased to be in an operating temperature range. The heater 230 can stop heating when the temperature is higher than a preset temperature, for example, 10° C. Because a good area contact is formed between each cell 210 and the thermal conducting medium 220, a good thermal conduction can be realized between different cells 210, and hence temperatures of the plurality of cells 210 can be maintained uniform.

Figure 16:
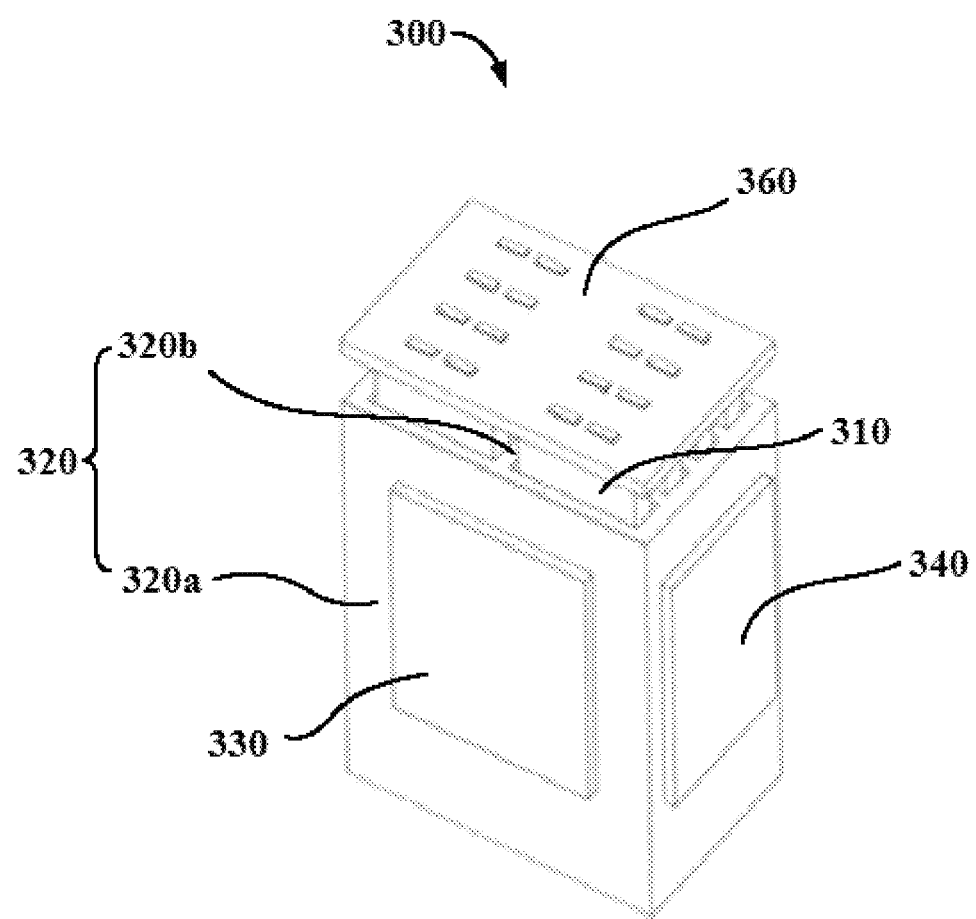
FIG. 16 shows a perspective view of a battery in accordance with another embodiment of the disclosure.

FIG. 16 shows another example battery 300 consistent with the disclosure. The battery 300 comprises cells 310, a thermal conducting medium 320, temperature-changing apparatuses 330 and 340, and a controller (not shown).

The battery 300 further comprises an electrode tab plate 360. The cells 310 can be soldered on the electrode tab plate 360 and connected in series and/or parallel, and immersed in the thermal conducting medium 320. A good area contact between the thermal conducting medium 320 and the surfaces of the cells 310 can be formed. In some embodiments, as shown in FIG. 16, the thermal conducting medium 320 comprises a thermal conducting housing 320a and a thermal conducting frame 320b provided in the thermal conducting housing 320a. The thermal conducting medium 320 can be made of aluminum, an aluminum alloy, copper, or copper alloy. The temperature-changing apparatuses 330 and 340 can include semiconductor heating-cooling plates (hereinafter also simply referred to as semiconductor cooling plates). One side of the semiconductor cooling plate can generate heat while the other side thereof can cool down, depending on a direction of an electric current applied to the semiconductor cooling plate. The semiconductor cooling plates can be mounted on the sidewalls of the thermal conducting housing 320a of the thermal conducting medium 320.

In some embodiments, when the battery 300 is overheated during discharging (for example, higher than 45° C.), the temperature sensor can detect the temperature and feed it back to a control unit. Sides of the semiconductor cooling plates in proximity to the thermal conducting medium 320 can start to cool down. The semiconductor cooling plates can be deactivate when the temperature of the battery 300 drops to 40° C. Meanwhile, the heat generated by the cells 310 can be transferred to the thermal conducting housing 320a of the thermal conducting medium 320 by the thermal conducting medium 320 and dissipated through thermal radiation. Because a good area contact is formed between each cell 310 and the thermal conducting medium 320, a good thermal conduction can be realized between different cells 310, and hence temperatures of the plurality of cells 310 can be maintained uniform.

In some embodiments, when the temperature of the battery 300 is too low (for example, lower than 5° C.), the temperature sensor can detect the temperature and feed it back to the control unit. The sides of the semiconductor cooling plates in proximity to the thermal conducting medium 320 can start to heat. For example, the battery 300 can provide a low current to power the semiconductor cooling plates to generate heat. Because a good thermal conduction is formed between the semiconductor cooling plates and the thermal conducting housing 320a of the thermal conducting medium 320, the heat generated by the semiconductor cooling plates can be transferred to each cell 310 through the thermal conducting medium 320 to increase a temperature of each cell 310, such that the temperature of the battery 300 can be increased to be in an operating temperature range. The semiconductor cooling plates can stop heating when the temperature is higher than a preset temperature, for example 10° C. Because a good area contact is formed between each cell 310 and the thermal conducting medium 320, a good thermal conduction can be realized between different cells 310, and hence temperatures of the plurality of cells 310 can be maintained uniform.

Figure 17:
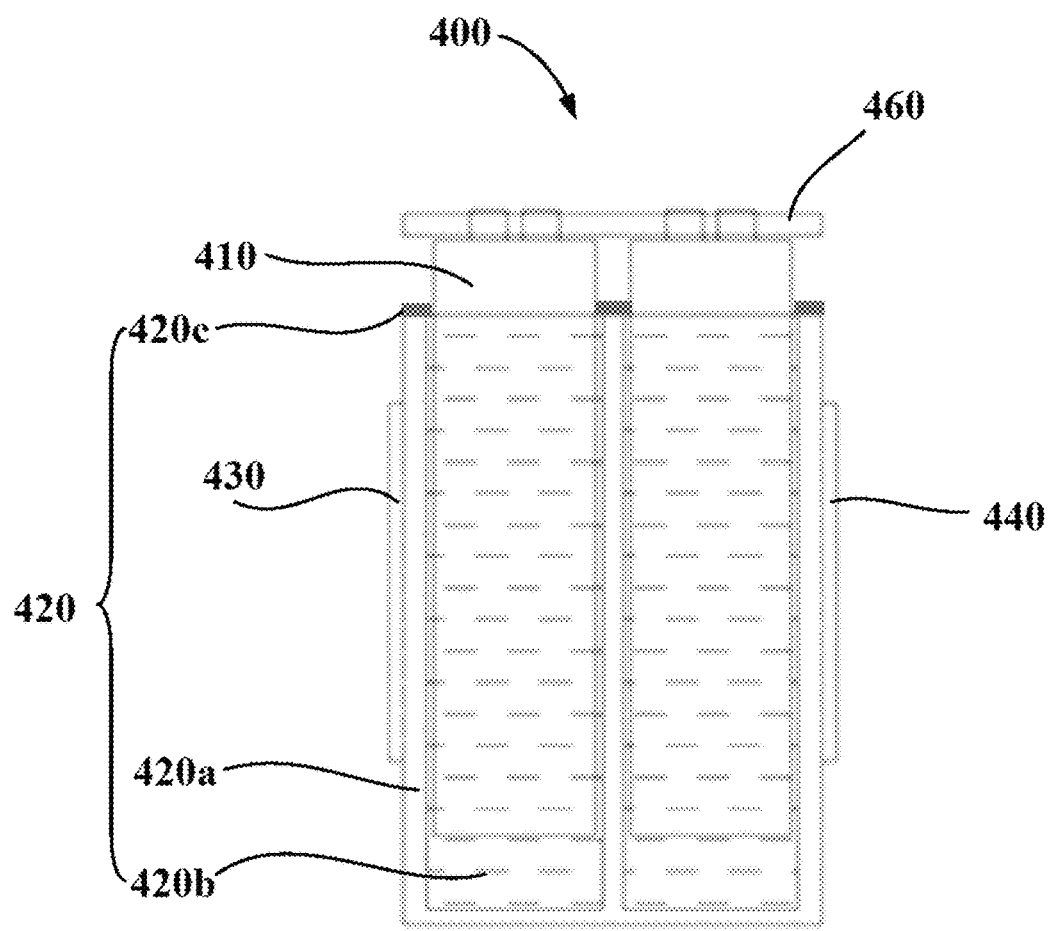
FIG. 17 shows a sectional view of a battery in accordance with another embodiment of the disclosure.

FIG. 17 shows another example battery 400 consistent with the disclosure. As shown in FIG. 17, the battery 400 comprises cells 410, a thermal conducting medium 420, temperature-changing apparatuses 430 and 440, and a controller. The battery 400 differs from the battery 300 in that, the thermal conducting medium 420 comprises a thermal conducting housing 420a, a heat-conducting fluid 420b contained in the thermal conducting housing 420a, and a sealant 420c sealing the heat-conducting fluid.

The battery 400 further comprises an electrode tab plate 460. The cells 410 can be soldered on the electrode tab plate 460 and connected in series and/or parallel, and immersed in the thermal conducting medium 420. An adequate surfaceto-surface contact can be effected between the heat-conducting fluid 420b and the surface of the cell 410. The temperature-changing apparatuses 430 and 440 can include semiconductor heating-cooling plates. One side of the semiconductor cooling plate can generate heat while the other side thereof can cool down, depending on a direction of an electric current applied to the semiconductor cooling plate. The semiconductor cooling plates can be mounted on the sidewalls of the thermal conducting housing 420a of the thermal conducting medium 420. The thermal conducting housing 420a can be made of, for example, aluminum, aluminum alloy, copper, or copper alloy. The heat-conducting fluid 420b can include, for example, a mixture of water, ethylene glycol, and propylene glycol. The sealant 420c can include, for example, silicone.

In some embodiments, when the battery 400 is overheated during discharging (for example, higher than 45° C.), the temperature sensor can detect the temperature and feed it back to a control unit. Sides of the semiconductor cooling plate in proximity to the thermal conducting medium 420 can start to cool down. The semiconductor cooling plates can be deactivate when the temperature of the battery 400 drops to 40° C. Meanwhile, the heat generated by the cell 410 can be transferred to the thermal conducting housing 420a of the thermal conducting medium 420 by the thermal conducting medium 420 and dissipated through thermal radiation. Because a good area contact is formed between each cell 410 and the thermal conducting medium 420, a good thermal conduction can be realized between different cells 410, and hence temperatures of the plurality of cells 410 can be maintained uniform.

In some embodiments, when the temperature of the battery 400 is too low (for example, lower than 5° C.), the temperature sensor can detect the temperature and feed it back to the control unit. The sides of the semiconductor cooling plates in proximity to the thermal conducting medium 420 can start to heat. For example, the battery 400 can provide a low current to power the semiconductor cooling plates to generate heat. Because a good thermal conduction is formed between the semiconductor cooling plates and the thermal conducting housing 420a of the thermal conducting medium 420, the heat generated by the semiconductor cooling plates can be transferred to each cell 410 through the thermal conducting medium 420 to increase a temperature of each cell 410, such that the temperature of the battery 400 can be increased to be in an operating temperature range. The semiconductor cooling plates can stop heating when the temperature is higher than a preset temperature, for example 10° C. Because a good area contact is formed between each cell 410 and the thermal conducting medium 420, a good thermal conduction can be realized between different cells 310, and hence temperatures of the plurality of cells 410 can be maintained uniform.

The disclosure also provides a method for protecting a cell of a battery, such as one of batteries 100, 200, 300, and 400 described above.

Figure 18:
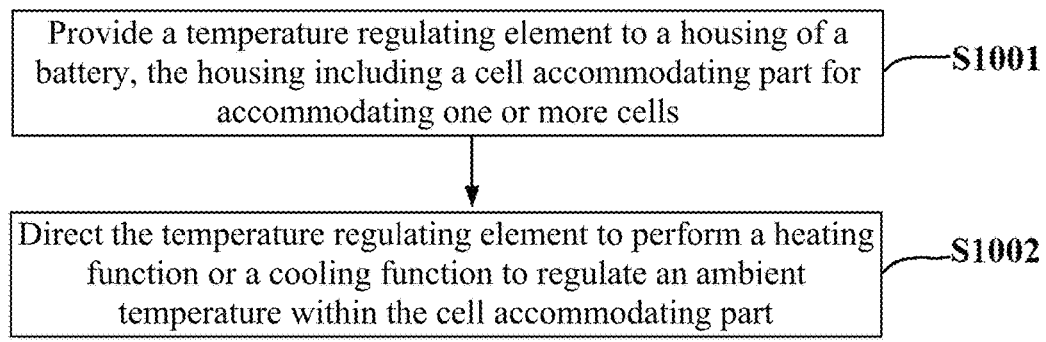
FIG. 18 shows a flowchart of a method for protecting a cell in accordance with an embodiment of the disclosure.

FIG. 18 shows an example cell protecting method consistent with the disclosure. As shown in FIG. 18, at S1001, a temperature regulating element is provided to a housing of a battery. The housing includes a cell accommodating part for accommodating a cell. At S1002, the temperature regulating element is directed to perform a heating function or a cooling function to regulate an ambient temperature within the cell accommodating part.

In order to better effect a thermal balance among a plurality of cells, the method can further comprise providing and sealing a heat-conducting fluid within the cell accommodating part, such that the cells are at least partially immersed in the heat-conducting fluid. For example, the heat-conducting fluid can comprise at least one of water, ethylene glycol, or propylene glycol.

The heat can be transferred from the temperature regulating element to the heat-conducting fluid in various ways in view of actual needs. In some embodiments, the method can further comprise immersing the temperature regulating element at least partially in the heat-conducting fluid to heat or cool down the heat-conducting fluid.

In some other embodiments, the method can comprise connecting the temperature regulating element with the housing, which includes a thermal conducting medium, and heating or cooling down the thermal conducting medium by a thermal conduction through the housing.

The heat-conducting fluid can be sealed in various ways. In some embodiments, the method can further comprise sealing a gap between an opening circumference of the cell accommodating part and the one or more cells using a sealant. The sealant can be, for example, a thermally conductive adhesive. Optionally, the sealant can be an electrical insulting adhesive.

In some other embodiments, the method can further comprise covering an opening of the housing with an electrode tab plate, and sealing a gap between the opening circumference of the housing and the electrode tab plate with a sealant. The sealant can be, for example, a thermally conductive adhesive. Optionally, the sealant can be an electrical insulting adhesive.

In some embodiments, the electrode tab plate and the heat-conducting fluid within the cell accommodating part can be thermally conductive but electrically insulated from each other. In some embodiments, the method can comprise providing a surface of the electrode tab plate 160 that is in proximity to the cell accommodating part 121 with an insulating surface.

In some embodiments, the method can comprise providing an electrically insulating and thermally conductive member between the electrode tab plate and the opening of the cell accommodating part. The electrically insulating and thermally conductive member seals the opening of the cell accommodating part, and the one or more cells pass through the electrically insulating and thermally conductive member. The electrode tab plate can exchange heat with the heat-conducting fluid through the electrically insulating and thermally conductive member.

In some embodiments, the electrode tab plate can be connected with but insulated from the opening circumference of the housing.

In some embodiments, the method can further comprise fixedly connecting a plurality of cells with the electrode tab plate, and mounting the temperature regulating element on the electrode tab plate, such that the battery can be more compact.

In some embodiments, the temperature regulating element can heat or cool down the one or more cells through a thermal conduction via the electrode tab plate. In some embodiments, the temperature regulating element can comprise a heating plate. The heating plate can be adhered to the electrode tab plate. The plurality of cells can be heated through a thermal conduction via the electrode tab plate.

In some other embodiments, the temperature regulating element can comprise a cooling plate. The cooling plate can be adhered to the electrode tab plate. The plurality of cells can be cooled down through a thermal conduction via the electrode tab plate.

In some other embodiments, the temperature regulating element can comprise a semiconductor cooling plate. The semiconductor cooling plate can be adhered to the electrode tab plate. The plurality of cells can be heated or cooled down through a thermal conduction via the electrode tab plate.

In some embodiments, the temperature regulating element can heat or cool down the one or more cells through an airflow thermal exchange. For example, the temperature regulating element can comprise a fan. The fan can be mounted on the electrode tab plate and configured to provide an airflow to the plurality of cells.

One or more types of temperature regulating elements can be provided. For example, the temperature regulating element can comprise at least one of a heater, a cooler, or a temperature-changing apparatus. The heater can be an electrical heater. The cooler can be an electrical cooling apparatus or a heat dissipation fan. The temperature-changing apparatus can be a semiconductor cooling plate.

The temperature regulating element can be provided in various ways in view of actual needs. In some embodiments, the housing can be a thermal conductor, and the temperature regulating element can be provided on an outer surface of the housing, provided on an inner surface of the housing, or embedded inside a sidewall of the housing.

In some other embodiments, the cell accommodating part can include a bottom, and the temperature regulating element can be provided on the bottom of the cell accommodating part.

In some other embodiments, the housing can be a thermal insulator. The temperature regulating element can be provided on the inner surface of the housing.

The battery can include one or more cell accommodating parts according to actual needs. In some embodiments, a plurality of cells and a plurality of cell accommodating parts corresponding to the plurality of cells can be provided. A mesh can be provided at the sidewall of each cell accommodating part through which adjacent cell accommodating parts can communicate with each other.

In order to further improve an efficiency of the cooling function and the heating function of the battery, the method can further comprise providing a thermally insulating casing such that the housing is accommodated in the casing with a gap between the housing and the casing forming a heat dissipation channel; and providing a heat dissipation fan to the heat dissipation channel, such that an airflow within the heat dissipation channel is driven and circulated to the outside environment of the casing.

In some instances, the heat dissipation fan can be deactivated when the temperature regulating element performs heating. The heat dissipation fan can be activated when the temperature regulating element performs cooling down.

The heat dissipation fan can be provided in various ways in view of actual needs. In some embodiments, the housing can communicate with the heat dissipation channel. The heat dissipation fan can drive an airflow within the cell accommodating part and discharge the airflow to the outside environment of the casing through the heat dissipation channel.

In some other embodiments, the battery can comprise an electrode tab plate. The plurality of cells can be fixedly connected with the electrode tab plate, and the heat dissipation fan can be mounted on the electrode tab plate.

In some other embodiments, the heat dissipation fan can be mounted on the sidewall or the bottom wall of the cell accommodating part.

In some other embodiments, the heat dissipation fan can be provided on the casing. The heat at the outer surface of the housing can be absorbed by an airflow flowing through the heat dissipation channel and discharged to the outside environment of the casing using the heat dissipation fan.

In some embodiments, the battery can further comprise a controller and a temperature sensor. The temperature sensor can be in communication connection with the temperature sensor. The temperature sensor can be configured to detect an ambient temperature within the cell accommodating part and transmit the detected ambient temperature to the controller. The controller can be electrically connected with the temperature regulating element to direct the temperature regulating element to perform heating or cooling down based upon the detected ambient temperature.

In some embodiments, directing the temperature regulating element to perform heating or cooling down to regulate an ambient temperature within the cell accommodating part can comprise the controller directing the temperature regulating element to perform cooling down if the detected ambient temperature is higher than a preset high temperature. The preset high temperature can be, for example, in a range of 40-50° C.

In some embodiments, directing the temperature regulating element to perform heating or cooling down to regulate an ambient temperature within the cell accommodating part can comprise the controller directing the temperature regulating element to perform heating if the detected ambient temperature is lower than a preset low temperature. The preset low temperature can be, for example, in a range of 5-10° C.

The disclosure also provides a movable platform including one of the batteries 100, 200, 300, and 400 described above. The movable platform can comprise an electric actuating device, a main controller, and a battery consistent with the disclosure, such as one of the above-described example batteries. The main controller can be configured to control an operating state of the electric actuating device. The battery can be coupled to the electric actuating device and provide power to the electric actuating device.

The disclosure also provides a kit that can be assembled to form the movable platform described above. The kit can comprise an electric actuating device, a main controller, and a battery consistent with the disclosure, such as one of the above-described example batteries. The main controller can be configured to control an operating state of the electric actuating device. The battery can provide power to the electric actuating device. In some instances, upon the kit is assembled, the battery can be coupled to the electric actuating device and the main controller can be electrically connected with the electric actuating device.

Figure 19:
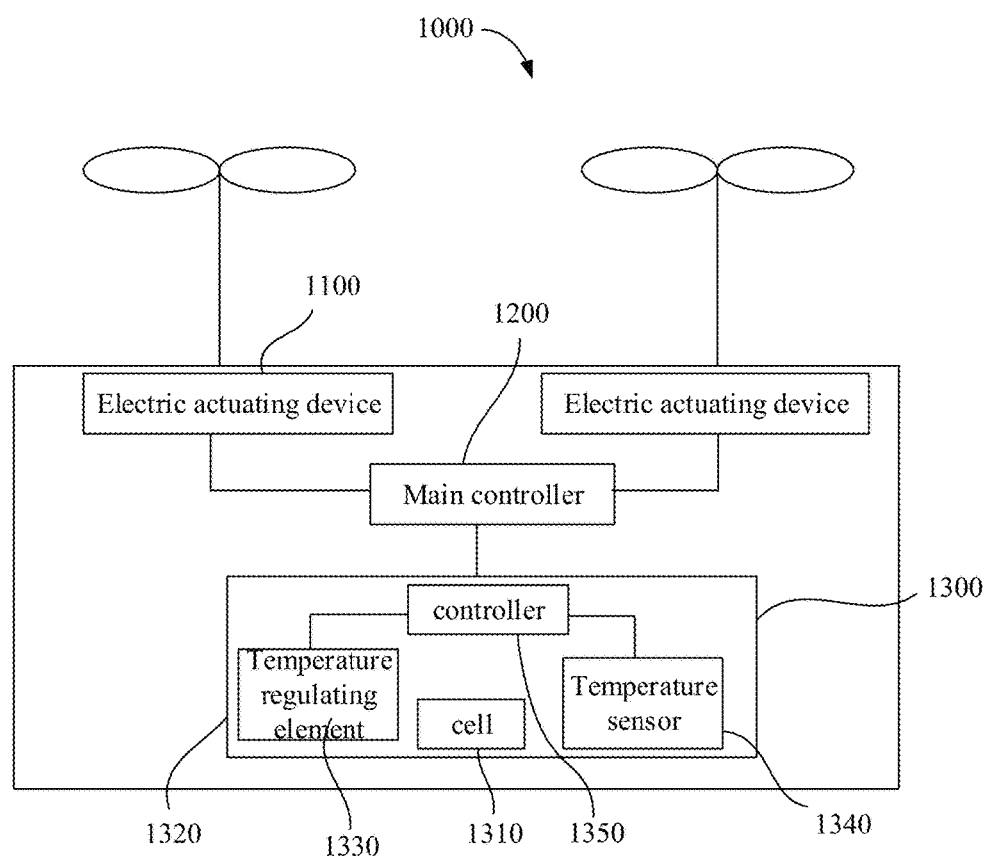
FIG. 19 shows a schematic circuit diagram of a movable platform in accordance with an embodiment of the disclosure.

FIG. 19 shows a block diagram of an example movable platform 1000 in accordance with some embodiments of the disclosure. The movable platform 1000 comprises an electric actuating device 1100, a main controller 1200, and a battery 1300. The main controller 1200 can be configured to control an operating state of the electric actuating device 1100. The battery 1300 can be coupled to the electric actuating device 1100 and provide power to the electric actuating device 1100.

The battery 1300 comprises a housing 1320, one or more cells 1310, and a temperature regulating element 1330. The housing 1320 can be include a cell accommodating part. The one or more cells 1310 can be provided in the cell accommodating part. The temperature regulating element 1330 can be configured to regulate an ambient temperature within the cell accommodating part.

In some embodiments, as shown in FIG. 19, the battery 1300 comprises a temperature sensor 1340 configured to detect an ambient temperature within the cell accommodating part. An operation of the temperature sensor 1340 can be designed in view of actual needs. In some embodiments, as shown in FIG. 19, the battery 1300 further comprises a controller 1350 and a temperature sensor 1340. The temperature sensor 1340 is in communication connection with the controller 1350. The temperature sensor 1340 can detect an ambient temperature within the cell accommodating part and transmit the detected ambient temperature to the controller 1350. The controller 1350 is electrically connected with the temperature regulating element 1330 and can direct the temperature regulating element 1330 to perform heating or cooling down based upon the detected ambient temperature.

In some embodiments, the controller 1350 can direct the temperature regulating element 1330 to perform cooling down if the detected ambient temperature is higher than a preset high temperature. For example, the preset high temperature can be in a range of 40-50° C.

The controller 1350 can direct the temperature regulating element 1330 to perform heating if the detected ambient temperature is lower than a preset low temperature. For example, the preset low temperature can be in a range of 5-10° C.

Figure 20:
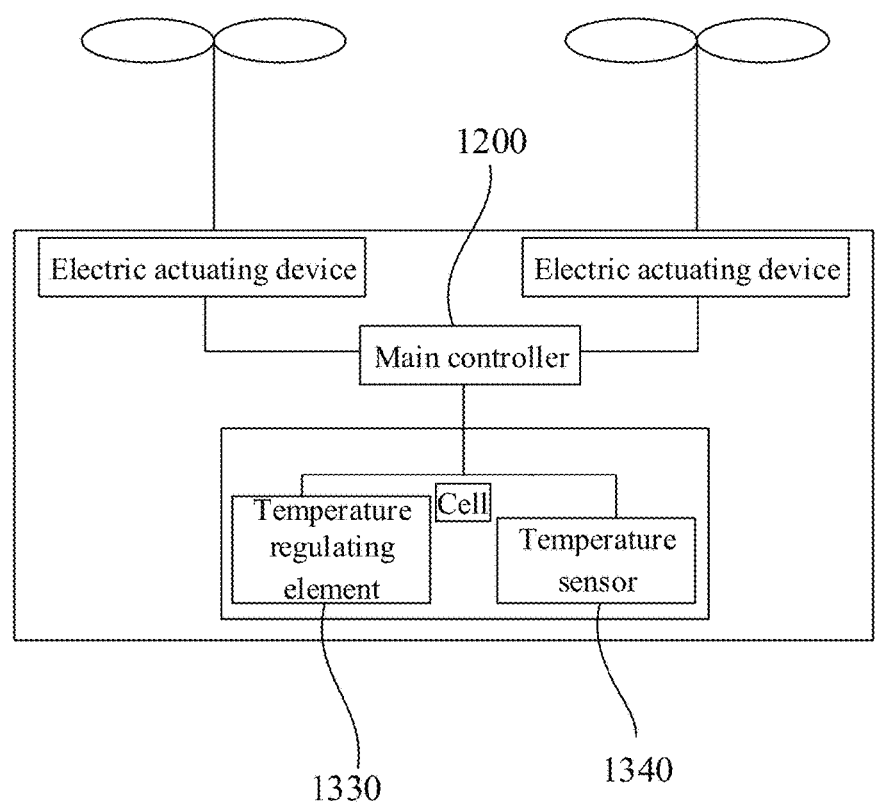
FIG. 20 shows a schematic circuit diagram of a movable platform in accordance with another embodiment of the disclosure.

FIG. 20 shows a block diagram of another example of the movable platform consistent with the disclosure. In the example shown in FIG. 20, the temperature sensor 1340 is in communication connection with the main controller 1200. The temperature sensor 1340 can detect an ambient temperature within the cell accommodating part and transmit the detected ambient temperature to the main controller 1200. The main controller 1200 is electrically connected with the temperature regulating element 1330 and can direct the temperature regulating element 1330 to perform heating or cooling down based upon the detected ambient temperature.

In some embodiments, the main controller 1200 can direct the temperature regulating element 1330 to perform cooling down if the detected ambient temperature is higher than a preset high temperature. For example, the preset high temperature can be in a range of 40-50° C.

The main controller 1200 can direct the temperature regulating element 1330 to perform heating if the detected ambient temperature is lower than a preset low temperature. For example, the preset low temperature can be in a range of 5-10° C.

It will be appreciated that, a structure, a connection, and an operation of the housing 1320, the cell 1310, and the temperature regulating element 1330 can be the same as or similar to those in the embodiments described above with reference to FIGS. 1-18. The battery 1300 can further comprise any elements in the embodiments described above. A detailed description thereof is omitted.

The movable platform 1000 can be a ground-based movable device, an in-air movable device, an on-water movable device, an in-water movable device, or a hand-held movable device. In some embodiments, the movable platform 1000 can be an unmanned aircraft or a remotely controlled vehicle. The electric actuating device 1100 can provide a power to actuate the movable platform 1000.

In some other embodiments, the movable platform 1000 can be a hand-held gimbal. The electric actuating device 1100 can provide a power to actuate the movable platform 1000 to adjust an attitude thereof.

Figure 21:
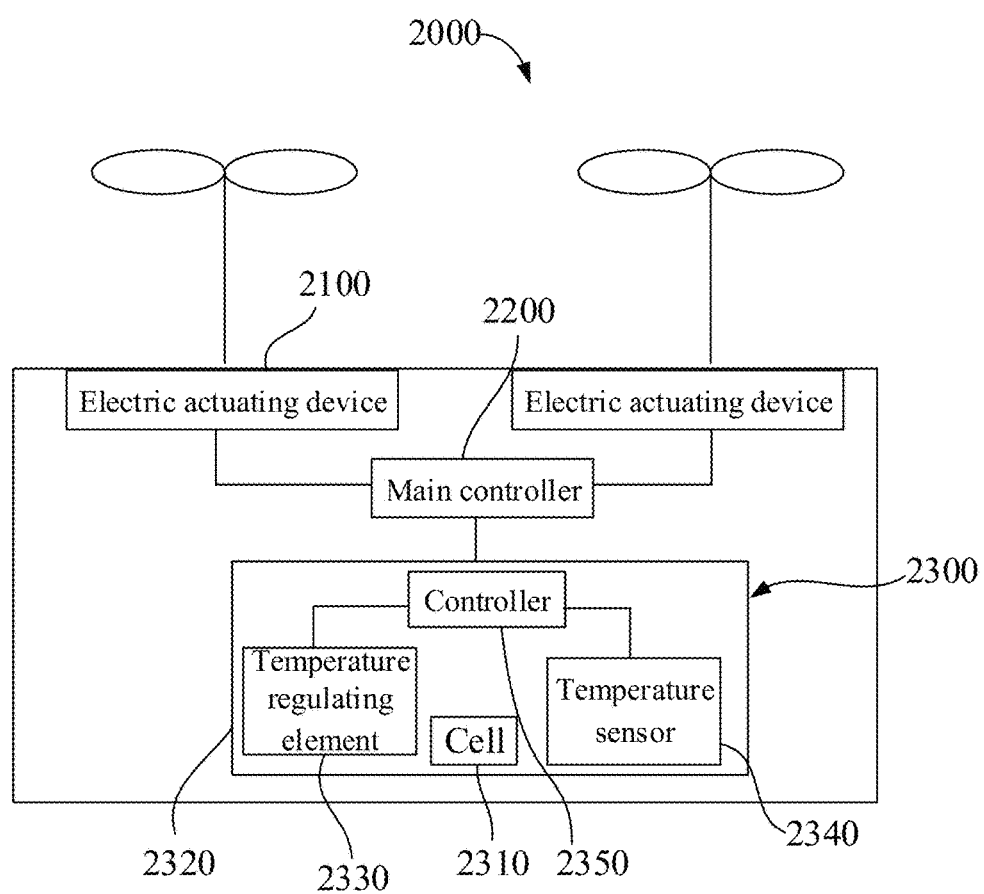
FIG. 21 shows a schematic circuit diagram of a movable platform in accordance with another embodiment of the disclosure.

FIG. 21 shows a block diagram of another example movable platform 2000 in accordance with some embodiments of the disclosure. The movable platform 2000 comprises an electric actuating device 2100, a main controller 2200, and a battery 2300. The main controller 2200 can be configured to control an operating state of the electric actuating device 2100. The battery 2300 can be coupled to the electric actuating device 2100 and provide power to the electric actuating device 2100.

The battery 2300 comprises a plurality of cells 2310, a housing 2320, and a flowable thermal conducting medium (not shown). The housing 2320 can be thermally conductive and can include a cell accommodating part. The plurality of cells 2310 can be accommodated in the cell accommodating part. The flowable thermal conducting medium can be contained in the cell accommodating part. In some embodiments, each of the plurality of cells 2310 can be at least partially enclosed by the flowable thermal conducting medium, such that a heat transfer between the plurality of cells 2310 can be effected by the flowable thermal conducting medium. The flowable thermal conducting medium can contact the cells 2310 to effect a thermal exchange with the cells 2310.

In some embodiments, the flowable thermal conducting medium may not fill up a remaining space of the cell accommodating part, such that the flowable thermal conducting medium can flow within the cell accommodating part.

In some embodiments, as shown in FIG. 21, the battery 2300 comprises a temperature sensor 2340 configured to detect an ambient temperature within the cell accommodating part. An operation of the temperature sensor 2340 can be designed in view of actual needs. In some embodiments, as shown in FIG. 21, the battery 2300 further comprises a temperature regulating element 2330 and a controller 2350. The temperature regulating element 2330 can be configured to regulate an ambient temperature within the cell accommodating part. The temperature sensor 2340 is in communication connection with the controller 2350. The temperature sensor 2340 can detect an ambient temperature within the cell accommodating part and transmit the detected ambient temperature to the controller 2350. The controller 2350 is electrically connected with the temperature regulating element 2330 and can direct the temperature regulating element 2330 to perform heating or cooling down based upon the detected ambient temperature.

In some embodiments, the controller 2350 can direct the temperature regulating element 2330 to perform cooling down if the detected ambient temperature is higher than a preset high temperature. For example, the preset high temperature can be in a range of 40-50° C.

The controller 1350 can direct the temperature regulating element 1330 to perform heating if the detected ambient temperature is lower than a preset low temperature. For example, the preset low temperature can be in a range of 5-10° C.

Figure 22:
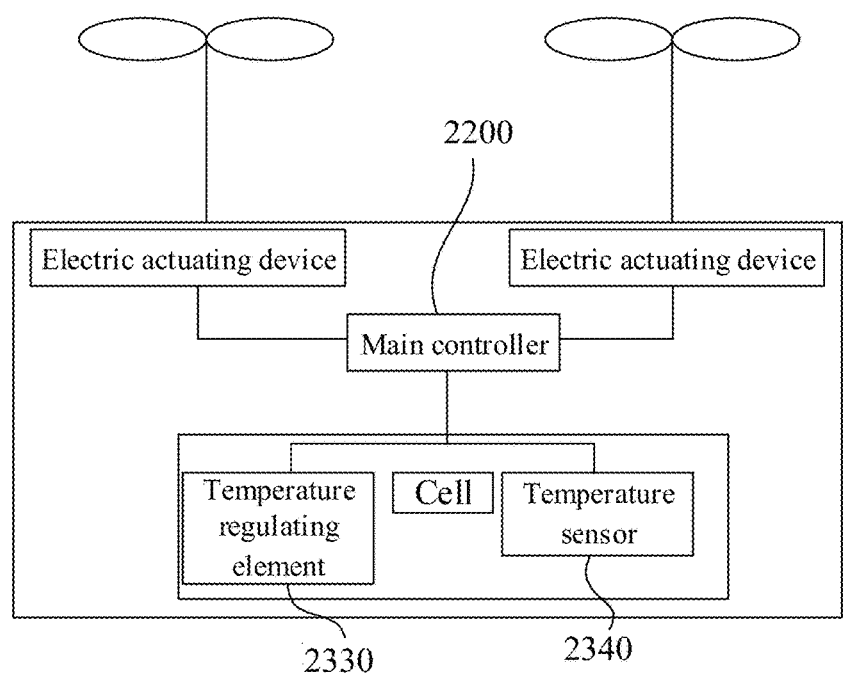
FIG. 22 shows a schematic circuit diagram of a movable platform in accordance with another embodiment of the disclosure.

FIG. 22 shows a block diagram of another example of the battery 2300 consistent with the disclosure. In the embodiment shown in FIG. 22, the battery 2300 comprises a temperature regulating element 2330 and a temperature sensor 2340. The temperature regulating element 2330 can be configured to regulate an ambient temperature within the cell accommodating part. The temperature sensor 2340 is in communication connection with a main controller 2200. The temperature sensor 2340 can detect an ambient temperature within the cell accommodating part and transmit the detected ambient temperature to the main controller 2200. The main controller 2200 is electrically connected with the temperature regulating element 2330 and can direct the temperature regulating element 2330 to perform heating or cooling down based upon the detected ambient temperature.

In some embodiments, the main controller 2200 can direct the temperature regulating element 2330 to perform cooling down if the detected ambient temperature is higher than a preset high temperature. For example, the preset high temperature can be in a range of 40-50° C.

The main controller 2200 can direct the temperature regulating element 2330 to perform heating if the detected ambient temperature is lower than a preset low temperature. For example, the preset low temperature can be in a range of 5-10° C.

It will be appreciated that, a structure, a connection and an operation of the housing 2320, the cells 2310, and the temperature regulating element 2330 can be the same as or similar to those in the embodiments described above. The battery 2300 can further comprise any elements in the embodiments described above. A detailed description thereof is omitted.

The movable platform 2000 can be a ground-based movable device, an in-air movable device, an on-water movable device, an in-water movable device, or a hand-held movable device. In some embodiments, the movable platform 2000 can be an unmanned aircraft or a remotely controlled vehicle. The electric actuating device 2100 can provide a power to actuate the movable platform 2000.

In some other embodiments, the movable platform 2000 can be a hand-held gimbal. The electric actuating device 2100 can provide power to actuate the movable platform 2000 to adjust an attitude thereof.

Figure 23:
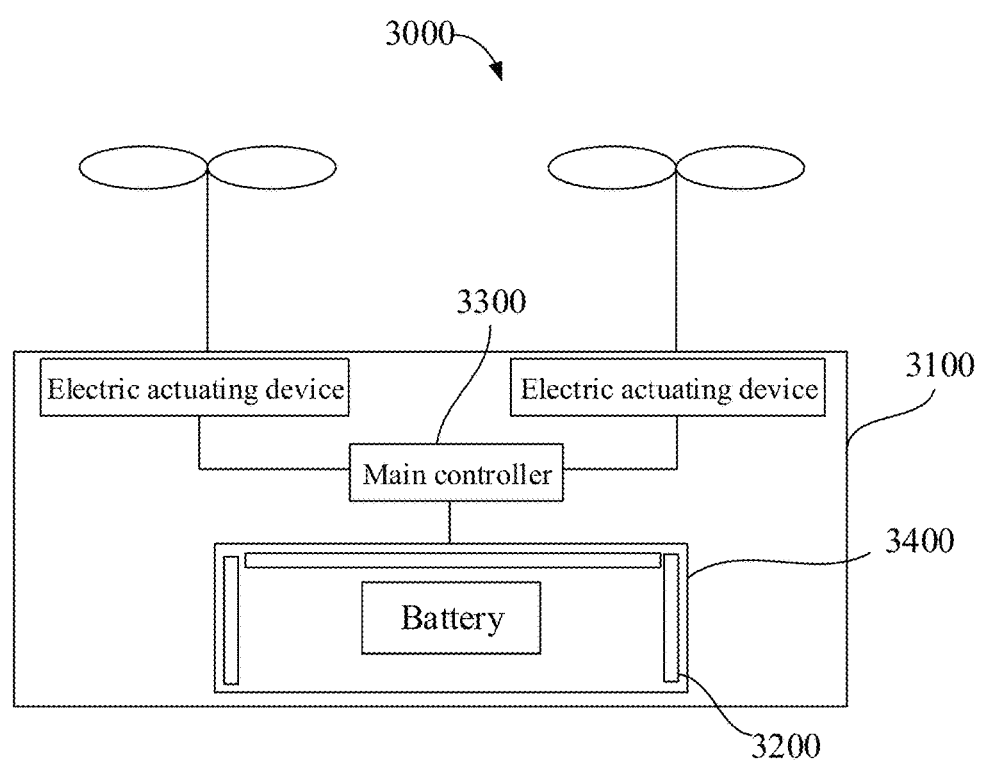
FIG. 23 shows a schematic circuit diagram of a movable platform in accordance with another embodiment of the disclosure.

FIG. 23 shows a block diagram of another example movable platform 3000 in accordance with some embodiments of the disclosure. The movable platform 3000 comprises a body 3100, a semiconductor cooling plate 3200, and a main controller 3300.

The body 3100 includes an accommodating part 3400 for receiving an electronic device. The semiconductor cooling plate 3200 can be configured to regulate an ambient temperature within the accommodating part 3400. The main controller 3300 is electrically connected with the semiconductor cooling plate 3200. In some embodiments, the main controller 3300 can be configured to control an electrical signal provided to the semiconductor cooling plate 3200 to change an operating state of the semiconductor cooling plate 3200.

In some embodiments, the electrical signal provided to the semiconductor cooling plate 3200 can comprise at least one of a direction of current, a magnitude of current, a direction of voltage, or a magnitude of voltage. In some embodiments, the main controller 3300 can be configured to control a direction of current provided to the semiconductor cooling plate 3200, such that a direction of thermal conduction of the semiconductor cooling plate 3200 can be altered. Optionally, the main controller 3300 can be configured to control a magnitude of current provided to the semiconductor cooling plate 3200, such that a thermal conduction efficiency of the semiconductor cooling plate 3200 can be altered.

The accommodating part 3400 can comprise a housing on which the semiconductor cooling plate 3200 can be mounted. In some embodiments, the housing can be thermally conductive, and the semiconductor cooling plate 3200 can be provided on an outer surface of the housing, provided on an inner surface of the housing, or embedded inside a sidewall of the housing. In some other embodiments, the housing can be a thermal insulator, and the semiconductor cooling plate 3200 can be provided on an inner surface of the housing.

The accommodating part 3400 can be configured to receive various electronic devices. In some embodiments, the accommodating part 3400 can be a battery compartment, and the semiconductor cooling plate 3200 can be configured to cool down or heat the battery received in the battery compartment.

In some other embodiments, the accommodating part 3400 can be a mounting groove for the main controller, and the semiconductor cooling plate 3200 can be configured to cool down or heat the main controller 3300 mounted in the mounting groove.

In some other embodiments, the accommodating part 3400 can be an electric motor mounting seat, and the semiconductor cooling plate 3200 can be configured to cool down or heat the electric motor mounted in the electric motor mounting seat.

In some other embodiments, the accommodating part 3400 can be a housing of a visual sensor and configured to cool down or heat an internal electronic component of the visual sensor. The visual sensor can be a monocular sensor or a binocular sensor.

In some embodiments, the semiconductor cooling plate 3200 can be configured to cool down or heat an inner space of the electronic device in a direct manner. In some other embodiments, the semiconductor cooling plate 3200 can be configured to cool down or heat the inner space of the electronic device in an indirect manner. For example, the movable platform 3000 can comprise an airflow channel, which communicates with the accommodating part 3400. The semiconductor cooling plate 3200 can be provided in the airflow channel to cool down or heat an airflow flowing through the airflow channel into the accommodating part 3400.

The movable platform 3000 can be an unmanned aircraft, a gimbal, or a remotely controlled vehicle.

The movable platform as discussed in embodiments of the disclosure can be advantageous over conventional technologies in various aspects.

For example, the battery can be provided with a temperature regulating element configured to increase or decrease an ambient temperature of the cell accommodating part of the housing. The temperature regulating element can perform cooling down if a temperature of cell in the cell accommodating part is high. The temperature regulating element can perform heating if a temperature of cell in the cell accommodating part is low. Therefore, the cell can be effectively protected.

For example, a flowable thermal conducting medium can be provided in the cell accommodating part of the battery. The flowable thermal conducting medium can fill a gap between a plurality of cells to balance a temperature difference between the plurality of cells. Therefore, a performance in thermal management of the battery can be improved.

For example, the flowable thermal conducting medium in the battery can be a heat-conducting solid such as heat-conducting particles or heat-conducting powders. A lower requirement is imposed in sealing the heat-conducting solid within the housing of the battery as compared to a situation where the heat-conducting fluid is employed. Furthermore, it is convenient to disassemble and repair the battery. For example, the heat-conducting solid can be directly collected when the cell is being replaced.

For example, the temperature regulating element in the battery can be a semiconductor cooling plate which is capable of performing both heating and cooling down. For example, the semiconductor cooling plate can decrease a temperature of the environment within the battery accommodating part if a forward current is provided to the semiconductor cooling plate. The semiconductor cooling plate can increase a temperature of the environment within the battery accommodating part if a reverse current is provided to the semiconductor cooling plate. Therefore, it is not necessary to provide both a heating device and a cooling device. An inner space of the battery can be reduced, and a cost of the battery can be lowered.

It will be appreciated that, the device and method as disclosed in the embodiments of the disclosure can be provided with other approaches. For example, the device embodiments as described hereinabove are merely illustrative. For example, a division of the modules and units is merely a logical and functional division, and various other divisions can be possible. For example, various units or components can be combined or integrated into another system, or certain features can be omitted or not performed. Moreover, a coupling, a direct coupling or a communication connection as illustrated or discussed in the disclosure can be an indirect coupling or a communication connection via an interface, a means or a unit, and can be an electrical coupling, a mechanical coupling or a coupling in other forms.

The units illustrated as separate parts may or may not be physically separated. The parts shown as units may or may not be physical units. For example, the parts can be provided at the same location or distributed over a plurality of network units. All or part of the units can be selected to implement the embodiments of the disclosure according to actual requirements.

Various functional units in the embodiments of the disclosure may be integrated into a processing unit or may be provided as physically separate units. Two or more units can be integrated into one single unit. The integrated units can be implemented either in hardware or in software.

The integrated units can be stored in a computer readable storage medium when implemented in form of software functional units and sold or used as a standalone product. All or part of the technical solution of the disclosure can be embodied in the form of software product stored in a storage medium comprising a number of instructions for causing a computer processor to perform the entire or part of a method in accordance with embodiments of the disclosure, such as one of the above-described example methods. The storage medium can comprise a flask disk, a removable hard drive, a read only memory (ROM), a random access memory (RAM), a magnet disk, an optical disk, or another medium capable of storing program code.

The battery consistent with the disclosure can be provided with a temperature regulating element configured to increase or decrease an ambient temperature of a cell accommodating part of a housing of the battery. The temperature regulating element can perform cooling down if a temperature of a cell in the cell accommodating part is high, and can perform heating if the temperature of the cell in the cell accommodating part is low. Therefore, the cell can be effectively protected. No circulating apparatus such as cooling pipe or pump is needed. Therefore, the battery and housing structure of the disclosure can have a compact configuration, a small power consumption, and an improved performance in thermal management.

The foregoing disclosure is merely illustrative of the embodiments of the disclosure but not intended to limit the scope of the disclosure. Any equivalent modifications to a structure or process flow, which are made without departing from the specification and the drawings of the disclosure, and a direct or indirect application in other relevant technical fields, shall also fall into the scope of the disclosure.

What is claimed is:

1. A battery comprising:
   a housing including a cell accommodating part;
   a cell accommodated in the cell accommodating part;
   a temperature regulating element configured to regulate an ambient temperature within the cell accommodating part; and
   a heat-conducting fluid sealed within the cell accommodating part, wherein the cell is at least partially immersed in the heat-conducting fluid.

2. The battery of claim 1, wherein the temperature regulating element is at least partially immersed in the heat-conducting fluid and is configured to heat and/or cool down the heat-conducting fluid.

3. The battery of claim 1, wherein:
   the housing includes a thermal conducting medium, and
   the temperature regulating element is connected with the housing and configured to heat and/or cool down the thermal conducting medium through a thermal conduction via the housing.

4. The battery of claim 1, further comprising:
   a sealant sealing a gap between a circumference of an opening of the cell accommodating part and the cell, the sealant including at least one of a thermally conductive adhesive or an electrically insulating adhesive.

5. The battery of claim 1, further comprising:
   an electrode tab plate covering an opening of the housing; and
   a sealant sealing a gap between a circumference of the opening of the housing and the electrode tab plate.

6. The battery of claim 5, wherein the electrode tab plate and the heat-conducting fluid are thermally conductive with but electrically insulated from each other.

7. The battery of claim 6, wherein a surface of the electrode tab plate in proximity to the cell accommodating part includes an insulating surface.

8. The battery of claim 6, further comprising:
   a sealing member provided between the electrode tab plate and an opening of the cell accommodating part, the sealing member being electrically insulating and thermally conductive,
   wherein a thermal exchanged is effected between the electrode tab plate and the heat transfer fluid through the sealing member.

9. The battery of claim 6, wherein:
   the cell is fixedly connected with the electrode tab plate, and
   the temperature regulating element is mounted on the electrode tab plate.

10. The battery of claim 9, wherein the temperature regulating element is configured to heat and/or cool down the cell through a thermal conduction via the electrode tab plate.

11. The battery of claim 1, wherein:
    the housing includes a thermal conductor, and
    the temperature regulating element is provided on an outer surface of the housing, provided on an inner surface of the housing, or embedded inside a sidewall of the housing.

12. The battery of claim 11, wherein:
    the cell accommodating part includes a bottom, and
    the temperature regulating element is provided on the bottom of the cell accommodating part.

13. The battery of claim 1, wherein:
    the housing includes a thermal insulator, and the temperature regulating element is provided on an inner surface of the housing.

14. The battery of claim 1, further comprising:
a thermally insulating casing accommodating the housing, a gap between the housing and the casing forming a heat dissipation channel; and
a heat dissipation fan provided at the heat dissipation channel and configured to drive an airflow within the heat dissipation channel to circulate to an outside environment of the casing,
wherein the heat dissipation fan is configured to:
be deactivated if the temperature regulating element performs heating, and
be activated if the temperature regulating element performs cooling.

15. The battery of claim 14, wherein:
the housing communicates with the heat dissipation channel, and
the heat dissipation fan is configured to drive an airflow within the cell accommodating part and discharge the airflow to the outside environment of the casing through the heat dissipation channel.

16. The battery of claim 1, further comprising:
a controller electrically connected with the temperature regulating element; and
a temperature sensor in communication connection with the controller,
wherein:
the temperature sensor is configured to detect the ambient temperature within the cell accommodating part and transmit the ambient temperature to the controller, and
the controller is configured to direct the temperature regulating element to perform heating or cooling down based upon the detected ambient temperature.

17. The battery of claim 16, wherein the controller is configured to direct the temperature regulating element to perform cooling down if the ambient temperature is higher than a preset high temperature.

18. The battery of claim 16, wherein the controller is configured to direct the temperature regulating element to perform heating if the ambient temperature is lower than a preset low temperature.

19. A movable platform, comprising:
an electric actuating device;
a main controller configured to control an operating state of the electric actuating device; and
a battery coupled to the electric actuating device and configured to provide power to the electric actuating device, the battery comprising:
a housing including a cell accommodating part;
a cell accommodated in the cell accommodating part;
a temperature regulating element configured to regulate an ambient temperature within the cell accommodating part; and
a heat-conducting fluid sealed within the cell accommodating part, wherein the cell is at least partially immersed in the heat-conducting fluid.

20. The movable platform of claim 19, wherein the battery further includes:
an electrode tab plate covering an opening of the housing; and
a sealant sealing a gap between a circumference of the opening of the housing and the electrode tab plate.

* * * * *